United States Patent
Zobel et al.

(10) Patent No.: US 7,340,776 B2
(45) Date of Patent: Mar. 4, 2008

(54) METHOD AND SYSTEM FOR CONFIGURING AND SCHEDULING SECURITY AUDITS OF A COMPUTER NETWORK

(75) Inventors: Robert David Zobel, Atlanta, GA (US); Timothy David Dodd, Tucker, GA (US); Sharon A. Millar, Dawsonville, GA (US); David Gerald Nesfeder, Jr., Suwanee, GA (US); Christopher S. Singer, Decatur, GA (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 10/066,367

(22) Filed: Jan. 31, 2002

(65) Prior Publication Data

US 2002/0104014 A1 Aug. 1, 2002

Related U.S. Application Data

(60) Provisional application No. 60/265,519, filed on Jan. 31, 2001.

(51) Int. Cl.
*G06F 12/14* (2006.01)
(52) U.S. Cl. .............................. 726/24; 726/22; 726/23; 713/188
(58) Field of Classification Search ................ 713/200, 713/201, 188–189; 709/223–226; 702/186; 714/47, 37; 718/103; 726/22–25; 706/45–47, 706/52
See application file for complete search history.

(56) References Cited

U.S. PATENT DOCUMENTS

| | | | |
|---|---|---|---|
| 4,223,380 A | 9/1980 | Antonaccio et al. |
| 4,400,769 A | 8/1983 | Kaneda et al. |
| 4,672,609 A | 6/1987 | Humphrey et al. |
| 4,773,028 A | 9/1988 | Tallman |

(Continued)

FOREIGN PATENT DOCUMENTS

EP 0 636 977 5/2001

(Continued)

OTHER PUBLICATIONS

International Search Report dated Aug. 8, 2002.

(Continued)

*Primary Examiner*—Kim Vu
*Assistant Examiner*—Yin-Chen Shaw
(74) *Attorney, Agent, or Firm*—King & Spalding LLP

(57) ABSTRACT

Managing the selection and scheduling of security audits run on a computing network. The computer network is surveyed by a security audit system to determine the function and relative importance of the elements in the network. Based on function and priority, a more thorough type of security audit is selected to run against each of the network elements by the security audit system. The security audit can also be automatically scheduled based on the information gathered from the survey. Once the system runs the security audit, a vulnerability assessment can be calculated for each element in the network. The vulnerability assessment can be presented in a format that facilitates interpretation and response by someone operating the system. The vulnerability assessment can also be used to configure and schedule future security audits.

19 Claims, 22 Drawing Sheets

U.S. PATENT DOCUMENTS

| | | |
|---|---|---|
| 4,819,234 A | 4/1989 | Huber |
| 4,975,950 A | 12/1990 | Lentz |
| 5,032,979 A | 7/1991 | Hecht et al. |
| 5,121,345 A | 6/1992 | Lentz |
| 5,204,966 A | 4/1993 | Wittenberg et al. |
| 5,210,704 A | 5/1993 | Husseiny |
| 5,274,824 A | 12/1993 | Howarth |
| 5,278,901 A | 1/1994 | Shieh et al. |
| 5,309,562 A | 5/1994 | Li |
| 5,311,593 A | 5/1994 | Carmi |
| 5,345,595 A | 9/1994 | Johnson et al. |
| 5,347,450 A | 9/1994 | Nugent |
| 5,353,393 A | 10/1994 | Bennett et al. |
| 5,359,659 A | 10/1994 | Rosenthal |
| 5,371,852 A | 12/1994 | Attanasio et al. |
| 5,398,196 A | 3/1995 | Chambers |
| 5,414,833 A | 5/1995 | Hershey et al. |
| 5,440,723 A | 8/1995 | Arnold et al. |
| 5,452,442 A | 9/1995 | Kephart |
| 5,454,074 A | 9/1995 | Hartel et al. |
| 5,475,839 A | 12/1995 | Watson et al. |
| 5,511,184 A | 4/1996 | Lin |
| 5,515,508 A | 5/1996 | Pettus et al. |
| 5,522,026 A | 5/1996 | Records et al. |
| 5,539,659 A | 7/1996 | McKee et al. |
| 5,557,742 A | 9/1996 | Smaha et al. |
| 5,586,260 A | 12/1996 | Hu |
| 5,590,331 A | 12/1996 | Lewis et al. |
| 5,606,668 A | 2/1997 | Shwed |
| 5,623,600 A | 4/1997 | Ji et al. |
| 5,623,601 A | 4/1997 | Vu |
| 5,630,061 A | 5/1997 | Richter et al. |
| 5,649,095 A | 7/1997 | Cozza |
| 5,649,185 A | 7/1997 | Antognini et al. |
| 5,675,711 A | 10/1997 | Kephart et al. |
| 5,696,486 A | 12/1997 | Poliquin et al. |
| 5,696,822 A | 12/1997 | Nachenberg |
| 5,706,210 A | 1/1998 | Kumano et al. |
| 5,715,395 A * | 2/1998 | Brabson et al. ............. 709/226 |
| 5,734,697 A | 3/1998 | Jabbarnezhad |
| 5,745,692 A | 4/1998 | Lohmann, II et al. |
| 5,748,098 A | 5/1998 | Grace |
| 5,761,504 A | 6/1998 | Corrigan et al. |
| 5,764,887 A | 6/1998 | Kells et al. |
| 5,764,890 A | 6/1998 | Glasser et al. |
| 5,765,030 A | 6/1998 | Nachenberg et al. |
| 5,774,727 A | 6/1998 | Walsh et al. |
| 5,787,177 A | 7/1998 | Leppek |
| 5,790,799 A | 8/1998 | Mogul |
| 5,796,942 A | 8/1998 | Esbensen |
| 5,798,706 A | 8/1998 | Kraemer et al. |
| 5,812,763 A | 9/1998 | Teng |
| 5,815,574 A | 9/1998 | Fortinsky |
| 5,822,517 A | 10/1998 | Dotan |
| 5,826,013 A | 10/1998 | Nachenberg |
| 5,828,833 A | 10/1998 | Belville et al. |
| 5,832,208 A | 11/1998 | Chen et al. |
| 5,832,211 A | 11/1998 | Blakley, III et al. |
| 5,835,726 A | 11/1998 | Shwed et al. |
| 5,838,903 A | 11/1998 | Blakely, III et al. |
| 5,842,002 A | 11/1998 | Schnurer et al. |
| 5,845,067 A | 12/1998 | Porter et al. |
| 5,848,233 A | 12/1998 | Radia et al. |
| 5,854,916 A | 12/1998 | Nachenberg |
| 5,857,191 A | 1/1999 | Blackwell, Jr. et al. |
| 5,864,665 A | 1/1999 | Tran |
| 5,864,803 A | 1/1999 | Nussbaum |
| 5,872,978 A | 2/1999 | Hoskins |
| 5,875,296 A | 2/1999 | Shi et al. |
| 5,878,420 A | 3/1999 | de la Salle |
| 5,881,236 A | 3/1999 | Dickey |
| 5,884,033 A | 3/1999 | Duvall et al. |
| 5,892,903 A | 4/1999 | Klaus |
| 5,899,999 A | 5/1999 | De Bonet |
| 5,905,859 A | 5/1999 | Holloway et al. |
| 5,907,834 A | 5/1999 | Kephart et al. |
| 5,919,257 A | 7/1999 | Trostle |
| 5,919,258 A | 7/1999 | Kayashima et al. |
| 5,922,051 A | 7/1999 | Sidey |
| 5,925,126 A | 7/1999 | Hsieh |
| 5,931,946 A * | 8/1999 | Terada et al. ................ 713/201 |
| 5,940,591 A | 8/1999 | Boyle et al. |
| 5,950,012 A | 9/1999 | Shiell et al. |
| 5,961,644 A | 10/1999 | Kurtzberg et al. |
| 5,964,839 A | 10/1999 | Johnson et al. |
| 5,964,889 A | 10/1999 | Nachenberg |
| 5,974,237 A | 10/1999 | Shurmer et al. |
| 5,974,457 A | 10/1999 | Waclawsky et al. |
| 5,978,917 A | 11/1999 | Chi |
| 5,983,270 A | 11/1999 | Abraham et al. |
| 5,983,348 A | 11/1999 | Ji |
| 5,983,350 A | 11/1999 | Minear et al. |
| 5,987,606 A | 11/1999 | Cirasole et al. |
| 5,987,610 A | 11/1999 | Franczek et al. |
| 5,987,611 A | 11/1999 | Freund |
| 5,991,856 A | 11/1999 | Spilo et al. |
| 5,991,881 A | 11/1999 | Conklin et al. |
| 5,999,711 A | 12/1999 | Misra et al. |
| 5,999,723 A | 12/1999 | Nachenberg |
| 6,003,132 A | 12/1999 | Mann |
| 6,006,016 A | 12/1999 | Faigon et al. |
| 6,009,467 A | 12/1999 | Ratcliff et al. |
| 6,014,645 A | 1/2000 | Cunningham |
| 6,016,553 A | 1/2000 | Schneider et al. |
| 6,021,510 A | 2/2000 | Nachenberg |
| 6,026,442 A | 2/2000 | Lewis et al. |
| 6,029,256 A | 2/2000 | Kouznetsov |
| 6,035,323 A | 3/2000 | Narayen et al. |
| 6,035,423 A | 3/2000 | Hodges et al. |
| 6,041,347 A | 3/2000 | Harsham et al. |
| 6,052,709 A | 4/2000 | Paul |
| 6,061,795 A | 5/2000 | Dircks et al. |
| 6,067,410 A | 5/2000 | Nachenberg |
| 6,070,190 A | 5/2000 | Reps et al. |
| 6,070,244 A | 5/2000 | Orchier et al. |
| 6,073,172 A | 6/2000 | Frailong et al. |
| 6,081,894 A | 6/2000 | Mann |
| 6,085,224 A | 7/2000 | Wagner |
| 6,088,803 A | 7/2000 | Tso et al. |
| 6,088,804 A | 7/2000 | Hill et al. |
| 6,092,194 A | 7/2000 | Touboul |
| 6,094,731 A | 7/2000 | Waldin et al. |
| 6,098,173 A | 8/2000 | Elgressy et al. |
| 6,104,783 A | 8/2000 | DeFino |
| 6,108,799 A | 8/2000 | Boulay et al. |
| 6,118,940 A | 9/2000 | Alexander, III et al. |
| 6,119,165 A | 9/2000 | Li et al. |
| 6,119,234 A | 9/2000 | Aziz et al. |
| 6,122,738 A | 9/2000 | Millard |
| 6,144,961 A | 11/2000 | de la Salle |
| 6,154,844 A | 11/2000 | Touboul et al. |
| 6,161,109 A | 12/2000 | Matamoros et al. |
| 6,167,520 A | 12/2000 | Touboul |
| 6,173,413 B1 | 1/2001 | Slaughter et al. |
| 6,185,689 B1 * | 2/2001 | Todd et al. ................. 713/201 |
| 6,195,687 B1 | 2/2001 | Greaves et al. |
| 6,199,181 B1 | 3/2001 | Rechef et al. |
| 6,205,552 B1 * | 3/2001 | Fudge ........................ 713/201 |
| 6,220,768 B1 * | 4/2001 | Barroux ...................... 709/224 |
| 6,226,372 B1 | 5/2001 | Beebe et al. |
| 6,230,288 B1 | 5/2001 | Kuo et al. |
| 6,266,773 B1 | 7/2001 | Kisor et al. |
| 6,266,774 B1 | 7/2001 | Sampath et al. |
| 6,271,840 B1 | 8/2001 | Finseth et al. |

| | | |
|---|---|---|
| 6,272,641 B1 | 8/2001 | Ji |
| 6,275,938 B1 | 8/2001 | Bond et al. |
| 6,275,942 B1 | 8/2001 | Bernhard et al. |
| 6,278,886 B1 | 8/2001 | Hwang |
| 6,279,113 B1 | 8/2001 | Vaidya |
| 6,282,546 B1 | 8/2001 | Gleichauf et al. |
| 6,298,445 B1 | 10/2001 | Shostack et al. |
| 6,301,668 B1 * | 10/2001 | Gleichauf et al. ........... 713/201 |
| 6,314,520 B1 | 11/2001 | Schell et al. |
| 6,314,525 B1 | 11/2001 | Mahalingham et al. |
| 6,321,338 B1 * | 11/2001 | Porras et al. ................ 713/201 |
| 6,324,627 B1 | 11/2001 | Kricheff et al. |
| 6,324,647 B1 | 11/2001 | Bowman-Amuah |
| 6,324,656 B1 * | 11/2001 | Gleichauf et al. ............. 714/37 |
| 6,338,141 B1 | 1/2002 | Wells |
| 6,347,374 B1 | 2/2002 | Drake et al. |
| 6,353,385 B1 | 3/2002 | Molini et al. |
| 6,357,008 B1 | 3/2002 | Nachenberg |
| 6,370,648 B1 * | 4/2002 | Diep ............................. 726/22 |
| 6,377,994 B1 | 4/2002 | Ault et al. |
| 6,396,845 B1 | 5/2002 | Sugita |
| 6,397,242 B1 | 5/2002 | Devine et al. |
| 6,397,245 B1 | 5/2002 | Johnson, II et al. |
| 6,405,318 B1 | 6/2002 | Rowland |
| 6,405,364 B1 | 6/2002 | Bowman-Amuah |
| 6,408,391 B1 | 6/2002 | Huff et al. |
| 6,415,321 B1 | 7/2002 | Gleichauf et al. |
| 6,429,952 B1 | 8/2002 | Olbricht |
| 6,434,615 B1 | 8/2002 | Dinh et al. |
| 6,438,600 B1 | 8/2002 | Greenfield et al. |
| 6,445,822 B1 | 9/2002 | Crill et al. |
| 6,453,345 B2 | 9/2002 | Trcka et al. |
| 6,453,346 B1 | 9/2002 | Garg et al. |
| 6,460,141 B1 | 10/2002 | Olden |
| 6,463,426 B1 | 10/2002 | Lipson et al. |
| 6,467,002 B1 * | 10/2002 | Yang ........................... 710/116 |
| 6,470,449 B1 | 10/2002 | Blandford |
| 6,477,585 B1 | 11/2002 | Cohen et al. |
| 6,477,648 B1 | 11/2002 | Schell et al. |
| 6,477,651 B1 | 11/2002 | Teal |
| 6,484,203 B1 | 11/2002 | Porras et al. |
| 6,487,666 B1 | 11/2002 | Shanklin et al. |
| 6,493,752 B1 | 12/2002 | Lee et al. |
| 6,496,858 B1 | 12/2002 | Frailong et al. |
| 6,499,107 B1 | 12/2002 | Gleichauf et al. |
| 6,510,523 B1 | 1/2003 | Perlman et al. |
| 6,517,587 B2 | 2/2003 | Satyavolu et al. |
| 6,519,647 B1 | 2/2003 | Howard et al. |
| 6,519,703 B1 | 2/2003 | Joyce |
| 6,530,024 B1 * | 3/2003 | Proctor ....................... 713/201 |
| 6,535,227 B1 | 3/2003 | Fox et al. |
| 6,546,493 B1 | 4/2003 | Magdych et al. |
| 6,563,959 B1 | 5/2003 | Troyanker |
| 6,574,737 B1 * | 6/2003 | Kingsford et al. ........... 713/201 |
| 6,578,147 B1 | 6/2003 | Shanklin et al. |
| 6,584,454 B1 | 6/2003 | Hummel, Jr. et al. |
| 6,601,190 B1 | 7/2003 | Meyer et al. |
| 6,606,744 B1 | 8/2003 | Mikurak |
| 6,618,501 B1 | 9/2003 | Osawa et al. |
| 6,628,824 B1 | 9/2003 | Belanger |
| 6,647,139 B1 | 11/2003 | Kunii et al. |
| 6,647,400 B1 | 11/2003 | Moran |
| 6,661,904 B1 | 12/2003 | Sasich et al. |
| 6,668,082 B1 | 12/2003 | Davison et al. |
| 6,668,084 B1 | 12/2003 | Minami |
| 6,681,331 B1 | 1/2004 | Munson et al. |
| 6,691,232 B1 | 2/2004 | Wood et al. |
| 6,704,874 B1 | 3/2004 | Porras et al. |
| 6,708,212 B2 | 3/2004 | Porras et al. |
| 6,711,127 B1 | 3/2004 | Gorman et al. |
| 6,711,615 B2 | 3/2004 | Porras et al. |
| 6,718,383 B1 | 4/2004 | Hebert |
| 6,721,806 B2 | 4/2004 | Boyd et al. |
| 6,725,377 B1 | 4/2004 | Kouznetsov |
| 6,725,378 B1 | 4/2004 | Schuba et al. |
| 6,775,780 B1 | 8/2004 | Muttik |
| 6,792,144 B1 | 9/2004 | Yan et al. |
| 6,792,546 B1 | 9/2004 | Shanklin et al. |
| 6,816,973 B1 | 11/2004 | Gleichauf et al. |
| 6,839,850 B1 | 1/2005 | Campbell et al. |
| 6,851,057 B1 | 2/2005 | Nachenberg |
| 6,883,101 B1 * | 4/2005 | Fox et al. ..................... 726/25 |
| 6,886,102 B1 | 4/2005 | Lyle |
| 6,889,168 B2 * | 5/2005 | Hartley et al. .............. 702/186 |
| 6,912,676 B1 * | 6/2005 | Gusler et al. .................. 714/47 |
| 7,013,395 B1 * | 3/2006 | Swiler et al. .................. 726/25 |
| 2001/0034847 A1 | 10/2001 | Gaul, Jr. |
| 2002/0032717 A1 | 3/2002 | Malan et al. |
| 2002/0032793 A1 | 3/2002 | Malan et al. |
| 2002/0032880 A1 | 3/2002 | Poletto et al. |
| 2002/0035698 A1 | 3/2002 | Malan et al. |
| 2002/0083331 A1 | 6/2002 | Krumel |
| 2002/0083334 A1 | 6/2002 | Rogers et al. |
| 2002/0138753 A1 | 9/2002 | Munson |
| 2002/0144156 A1 | 10/2002 | Copeland, III |
| 2003/0037136 A1 | 2/2003 | Labovitz et al. |
| 2003/0088791 A1 | 5/2003 | Porras et al. |
| 2003/0212903 A1 | 11/2003 | Porras et al. |
| 2004/0010718 A1 | 1/2004 | Porras et al. |

FOREIGN PATENT DOCUMENTS

| | | |
|---|---|---|
| EP | 0 985 995 | 8/2003 |
| WO | WO 93/25024 | 12/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/54458 | 9/2000 |
| WO | WO 01/84285 | 11/2001 |
| WO | WO 02/06928 | 1/2002 |
| WO | WO 02/056152 | 7/2002 |
| WO | WO 02/101516 | 12/2002 |

OTHER PUBLICATIONS

International Search Report dated Sep. 19, 2002.
Koilpillai et al., Recon-A Tool for Incident Detection, Tracking and Response, Darpa Information Survivability Conference and Exposition, 2000, pp. 199-206.
Alves-Foss, J., A Overview of SNIF: A Tool for Surveying Network Information Flow, Network and Distributed System Security, 1995, pp. 94-101.
Mansouri-Samani et al., A Configurable Event Service for Distributed Systems Configurable Distributed Systems, 1996, pp. 210-217.
International Search Report for PCT/US01/13769 of Mar. 8, 2002.
Jagannathan et al., System Design Document: Next-Generation Intrusion Detection Expert Systems (NIDES), Internet Citation, Mar. 9, 1993, XP002136082, pp. 1-66.
Koilpillai, Adaptive Network Security Management DARPA NGI PI Conference, Oct. 1998, pp. 1-27.
Hiverworld Continuous Adaptive Risk Management, Hiverworld, Inc., 1999-2000, pp. 1-14.
International Search Report for PCT/US02/04989 of Sep. 19, 2002.
International Search Report for PCT/US02/02917 of Aug. 8, 2002.
International Search Report for PCT/US03/00155 of Mar 15, 2003.
NXI Communications, Inc., White Paper, NTS Security Issues, Oct. 15, 2001, pp. 1-12.

Mounji et al., Distributed Audit Trail Analysis, Proceedings of the Symposium of Network and Distributed System Security, San Diego, CA, Feb. 16-17, 1995, pp. 102-112.

Wobber et al., Authentication in the Taos Operating System, ACM Transactions on Computer Systems, vol. 12, No. 1, Feb. 1994, pp. 3-32.

Mayer et al., The Design of the Trusted Workstation: A True Infosec Product, 13th National Computer Security Conference, Washing, DC, Oct. 1-4, 1990, pp. 827-839.

Dawson, Intrusion Protection for Networks, Byte, Apr. 1995, pp. 171-172.

Buhkan, Checkpoint Charlie, PC Week Networks, Nov. 27, 1995, pp. N1, N6-N7.

Process Software Technical Support Page, found on http://www.process.com/techsupport/whitesec.html, printed off of the Process Software website on Feb. 26, 2003, pp. 1-5.

Ganesan, BAfirewall: A Modern Firewall Design, Proceedings Internet Society Symposium on Network and Distributed System Security 1994, Internet Soc., 1994, pp. 99-108.

Lee, Trusted Systems, Chapter II-1-6 of Handbook of Information Security Management, Ed. Zella G. Ruthberg and Harold F. Tipton, Auerbach, Boston and New York, 1993, pp. 345-362.

Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.

Guha et al., Network Security via Reverse Engineering of TCP Code: Vulnerability Analysis and Proposed Solution, IEEE, Mar. 1996, pp. 603-610.

Garg et al., High Level Communication Primitives for Concurrent Systems, IEEE, 1988, pp. 92-99.

Hastings et al., TCP/IP Spoofing Fundamentals, IEEE, May 1996, pp. 218-224.

Snapp, Signature Analysis and Communication Issues in a Distributed Intrusion Detection System, Master Thesis, University of California, Davis, California, 1991, pp. 1-40.

Guha et al., Network Security via Reverse Engineering of TCP Code: Vulnerability Analysis and Proposed Solutions, IEEE, Jul. 1997, pp. 40-48.

Djahandari et al., An MBone for an Application Gateway Firewall, IEEE, Nov. 1997, pp. 72-81.

Kim et al., Implementing a Secure Login Environment: A Case Study of Using a Secure Network Layer Protocol, Department of Computer Science, University of Alabama, Jun. 1995, pp. 1-9.

Satyanarayanan, Integrating Security in a Large Distributed System, Acm Transaction on Computer Systems, vol. 7, No. 3, Aug. 1989, pp. 47-280.

Sammons, Nathaniel, "Multi-platform Interrogation and Reporting with Rscan," The Ninth Systems Administration Conference, LISA 1995, Monterrey, California, Sep. 17-22, 1995, pp. 75-87.

Dean et al., "Java Security: From HotJava to Netscape and Beyond," Proceedings of the 1996 IEEE Symposium on Security and Privacy, May 6-8, 1996, Oakland, California, pp. 190-200.

Fisch et al., "The Design of an Audit Trail Analysis Tool," Proceedings of the 10th Annual Computer Security Applications Conference, Dec. 5-9, 1994, Orlando, Florida, pp. 126-132.

Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 97-118.

Sugawara Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.

Casella, Karen A., "Security Administration in an Open Networking Environment," The Ninth Systems Administration Conference, LISA 1995, Monterrey, California, Sep. 17-22, 1995, pp. 67-73.

Burchell, Jonathan, "Vi-SPY: Universal NIM?" Virus Bulletin, Jan. 1995, pp. 20-22.

Benzel et al., "Identification of Subjects and Objects in a Trusted Extensible Client Server Architecture," 18th National Information Systems Security Conference, Oct. 10-13, 1995, Baltimore, Maryland, pp. 83-99.

Epstein et al., "Component Architectures for Trusted Netware," 18th National Information Systems Security Conference, Oct. 10-13, 1995, Baltimore, Maryland, pp. 455-463.

Varadharajan, Vijay, "Design and Management of a Secure Networked Administration System: A Practical Approach," 19th National Information Systems Security Conference, Oct. 22-25, 1996, Baltimore, Maryland, pp. 570-580.

Snapp et al., "DIDS (Distributed Intrusion Detection System)—Motivation, Architecture, and An Early Prototype,"14th National Computer Security Conference, Oct. 1-4, 1991, Washington, DC, pp. 167-176.

Broner et al., "IntelligentI/O Rule-Based Input/Output Processing for Operating Systems," Operating Systems Review, vol. 25, No. 3, Jul. 1991, pp. 10-26.

Drews et al., "Special Delivery—Automatic Software Distribution Can Make You a Hero," Network Computing, Aug. 1, 1994, pp. 80, 82-86, 89, 91-95.

Morrissey, Peter, "Walls," Network Computing, Feb. 15, 1996, pp. 55-59, 65-67.

Harlander, Dr. Magnus, "Central System Administration in a Heterogenous Unix Environment: GeNU Admin," Proceedings of the Eighth Systems Administration Conference (LISA VIII), Sep. 19-23, 1994, San Diego, California, pp. 1-8.

Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.

Anderson, Paul, "Towards a High-Level Machine Configuration System," Proceedings of the Eighth Systems Administration Conference (LISA VIII), Sep. 19-23, 1994, San Diego, California, pp. 19-26.

Cooper, Michael A., " Overhauling Rdist for the '90s," Proceedings of the Sixth Systems Administration Conference (LISA VI), Oct. 19-23, 1992, Long Beach, California, pp. 175-188.

Vangala et al., "Software Distribution and Management in a Networked Environment," Proceedings of the Sixth Systems Administration Conference, Oct. 19-23, 1992, Long Beach, California, pp. 163-170.

Kim et al., "The Design and Implementation of Tripwire: A File System Integrity Checker," 2nd ACM Conference on Computer and Communications Security, Nov. 2-4, 1994, Fairfax, Virginia, pp. 18-29.

Winn Schwartau, "e.Security™ -Solving 'Dumb Days' With Security Visualization," e-Security, Inc., Naples, FL 34103, 2000.

Anita D'Amico, Ph.D., "Assessment of Open e-Security Platform™ : Vendor-Independent Central Management of Computer Security Resources," Applied Visions, Inc., 1999.

"e.Security™ -Open Enterprise Security Management: Delivering an integrated, automated, centrally Managed Solution You Can Leverage Today and Tomorrow," e-Security, Inc., Naples, FL 34102, 1999.

"e.Security™ -Vision," e-Security, Inc., Naples, FL, 1999.

"e.Security™ -Administrator Workbench™," e-Security, Inc. Naples, FL, 1999.

"e.Security™ -Fact Sheet," e-Security, Inc., Naples, FL, 1999.

"e.Security™ -Open e-Security Platform™," e-Security, Inc. Naples, FL, 1999.

Babcock, "E-Security Tackles The Enterprise," Jul. 28, 1999; Inter@ctive Week, www.Zdnet.com.

Kay Blough, "In Search of More-Secure Extranets," Nov. 1, 1999, www.InformationWeek.com.

Paul H. Desmond, "Making Sense of Your Security Tools," Software Magazine and Wiesner Publishing, www.softwaremag.com, 1999.

Kay Blough, "Extra Steps Can Protect Extranets," Nov. 1, 1999, www.InformationWeek.com.

Sean Hao, "Software protects e-commerce—e-Security's product alerts networks when hackers attack," Florida Today, Florida.

Scott Weiss, "Security Strategies—E-Security, Inc., " product brief, Hurwitz Group, Inc., Mar. 24, 2000.

Sean Adee, CISA, "Managed Risk, Enhanced Response—The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

"e.Security—Introducing the First Integrated, Automated, and Centralized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems For Intrusions," Apr. 3, 2000, Post-Newsweek Business Information, Inc., www.gcn.com.

e.Security™, website pages (pp. 1-83), www.esecurityinc.com, e-Security, Inc., Naples, FL 34103, Sep. 14, 2000.

Peter Sommer, "Intrusion Detection Systems as Evidence," Computer Security Research Centre, United Kingdom.

Musman et al., System or Security Managers Adaptive Response Tool, DARPA Information Survivability Conference and Exposition, Jan. 25, 2000, pp. 56-68.

Gibson Research Corporation Web Pages, Shields Up!—Internet Connection Security Analysis, grc.com/default.htm, Laguna Hills, California, 2000.

Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man, and Cybernetics, vol. SMC-14, No. 6, Nov./Dec. 1984, pp. 885-888.

Mann et al., Analysis of User Procedural Compliance in Controlling a Simulated Process, IEEE Transactions on Systems, Man, and Cybernetics, vol. SMC-16, No. 4, Jul./Aug. 1986.

Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.

Arvind, Secure This. Inform, Association for Information and Image Management, Silver Spring, Sep./Oct. 1999, pp. 1-4.

Stevens, TCP/IP Illustrated, vol. 1, 1994, pp. 247.

Lee et al., A Generic Virus Detection Agent on the Internet, IEEE 30th Annual Hawaii International Conference on System Sciences, 1997, vol. 4.

Cutler, Inside Windows NT, 1993, Microsoft Press.

Duncan, Advanced MS-Doc, 1986, Microsoft Press.

McDaniel, IBM Dictionary of Computing, 1994, International Business Machines Corporation.

Burd, Systems Architecture, 1998, Course Technology, Second Edition.

Programmer's Guide PowerJ, 1997, Sybase.

Swimmer et al., Dynamic detection and classification of computer viruses using general behavior patterns, 1995, Proceedings of the Fifth International Virus Bulletin Conference, Boston.

Advanced Virus Detection Technology for the Next Millunnium, Aug. 1999, Network Associates, A Network Associates Executive White Paper, pp. 1-14.

Enterprise-Grade Anti-Virus Automation in the 21st Century, Jun. 2000, Symantec, Technology Brief, pp. 1-17.

Kephart et al., Blueprint for a Computer Immune System, 1997, Retrieved from Internet, URL: http//www.research.ibm.com/antivirus/scipapers/kephart/VB97, pp. 1-15.

Richardson, Enterprise Antivirus Software, Feb. 2000, Retrieved from Internet, URL: http://www.networkmagazine.com/article/nmg20000426S0006, pp. 1-6.

Understanding and Managing Polymorphic Viruses, 1996, Symantec, The Symantec Enterprise Papers, vol. XXX, pp. 1-13.

Gong, JavaTM Security Architecture (JDK1.0), Oct. 2, 1998, Sun Microsystems, Inc., Version 1.0, pp. i-iv, 1-62.

Softworks Limited VBVM Whitepaper, Nov. 3, 1998, Retrieved from the Internet, URL: http://web.archive.org/web/19981203105455/http://softworksltd.com/vbvm.html, pp. 1-4.

Kephart, A Biologically Inspired Immune System for Computers, 1994, Artificial Life IV, pp. 130-139.

International Search Report for PCT/US01/26804 of Mar. 21, 2002.

Kosoresow et al., Intrusion Detection via System Call Traces, IEEE Software, pp. 35-42, Sep./Oct. 1997.

Veldman, Heuristic Anti-Virus Technology, Proceedings 3rd International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Nachenberg, A New Technique for Detecting Polymorphic Computer Viruses, A thesis submitted in partial satisfaction of the requirements for the degree Master of Science in Computer Science, University of California Los Angeles, pp. 1-127, 1995.

Microsoft P-Code Technology, http://msdn.microsoft.com/archive/default.asp?url=/archive/en-us/dnarvc/html/msdn_c7pcode2.asp, pp. 1-6, Apr. 1992.

DJGPP COFF Spec, http://delorie.com/djgpp/doc/coff/, pp. 1-15, Oct. 1996.

Natvig, Sandbox Technolgy Inside AV Scanners, Virus Bulletin Conference, Sep. 2001, pp. 475-488.

Norman introduces a new technique for eliminating new computer viruses, found on Norman's website, file://c:/documents%20and%20settings\7489\local%20settings\temporary%20internet%20files\olk, pp. 1-2, published Oct. 25, 2001, printed from website Dec. 27, 2002.

International Search Report for PCT/US01/19142 of Jan. 17, 2003.

Using the CamNet BBS FAQ, http://www.cam.net.uk/manuals/bbsfaq/bbsfaq.htm, Jan. 17, 1997.

Express Storehouse Ordering System, "Assessing ESOS through the Network", http://www-bfs.ucsd.edu/mss/esos/man3.htm, Sep. 3, 1996.

NASIRE, NASRIC Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debian.org/FTP/net.html, Mar. 20, 1997.

Sundaram, An Introduction to Intrusion Detection, Copyright 1996, published at www.acm.org/crossroads/xrds2-4/intrus.html, pp. 1-12.

Samfat, IDAMN: An Intrusion Detection Architecture for Mobile Networks, IEEE Journal on Selected Areas in Communications, vol. 15, No. 7, Sep. 1997, pp. 1373-1380.

INFO: Visual Basic Supports P-Code and Native Code Compilation (Q229415), http://support.micorsoft.com/support/kb/articles/Q229/4/15.ASP, pp. 1-2, Apr. 28, 1999.

International Search Report for PCT/US99/29117 of May 2, 2000.

Nordin, U of MN OIT Security and Assurance, Feb. 9, 2000.

Internet Security Systems, RealSecure SiteProtector, SAFEsuite Decisions to SiteProtector Migration, Aug. 8, 2003, pp. 1-42.

Internet Security Systems, SAFEsuite Enterprise, SAFEsuite Decisions, 1998.

Internet Security Systems, SAFEsuite Enterprise, Recognizing the Need for Enterprise Security: An Introduction to SAFEsuite Decisions, Aug. 1998, pp. 1-9.

Internet Security Systems, SAFEsuite Decisions 2.6, Frequently Asked Questions, Feb. 21, 2001, pp. 1-10.

Internet Security Systems, SAFEsuite Decisions Version 1.0, User's Guide, 1998, pp. 1-78.

Porras et al., Emerald: Event Monitoring Enabling Responses to Anomalous Live Disturbances, Computer Science Laboratory, SRI International, Menlo Park, CA, Oct. 1997, pp. 353-365.

Cisco Systems, Empowering the Internet Generation, 1998.

Messmer, Start-Up Puts Hackers on BlackICE, Network World Fusion, http://www.nwfusion.com/cgi-bin/mailto/x/cgi, Apr. 21, 1999, pp. 1-2.

NetworkICE Corporation, Can You Explain How Your Product Can Protect a Remote User with a VPN Client?, 1998-1999, pp. 1-2, http://www.webarchive.org/web/20000304071415/advice.networkice.com/advice/support/kb/q000003/default.

Yasin, Start-Up Puts Network Intruders on Ice, http://www.internetweek.com/story/INW19990505S0001, May 5, 1999, pp. 1-2.

Morency, NetworkWorldFusion, http://nwfusion.com/cgi-bin/mailto/x.cgi, Jun. 28, 1999, pp. 1-2.

Rogers, Network ICE Touts Security Wares, Apr. 23, 1999, San Mateo, California, http://www.crn.com/showArticle.jhtml?articleID=18829106&flatPage=true, pp. 1-2.

Rogers, Network ICE Signs Resellers, May 26, 1999, San Mateo, California, http://www.crn.com/showArticle.jhtml?articleID=18805302&flatPage=true, pp. 1-2.

Internet Security Systems, I've Been Attacked! Now What?, Aug. 27, 1999, http://www.iss.net/security_center/advice/Support/KB/q000033/default.htm, pp. 1-2.

Internet Security Systems, What is the Format of "Attack-List.CSV"?, Aug. 21, 1999, http://www.iss.net/security_center/advice/Support/KB/q000018/default.htm, pp. 1-2.

Neumann et al., Experience with Emerald to date, Apr. 11-12, 1999, 1st USENIX Workshop on Intrusion Detection and Network Monitoring, Santa Clara, California, pp. 1-9.

Lindqvist et al., Detecting Computer and Network Misuse Through the Production-Based Expert System Toolset (P-BEST), May 9-12, 1999, Proceedings of the 1999 IEEE Symposium on Security and Privacy, Oakland, California, pp. 1-16.

Kendall, A Database of Computer Attacks for the Evaluation of Intrusion Detection Systems, Jun. 1999, Department of Defense Advanced Research Projects Agency, pp. 1-124.

Neumann, Computer Security and the U.S. Infrastructure, Nov. 6, 1997, Congressional Testimony, pp. 1-11.

Porras et al., Life Traffic Analysis of the TCP/IP Gateways, Nov. 10, 1997, Internet Society's Networks and Distributed Systems Security Systems Symposium, Mar. 1998, http://www.sdl.sri.com/projects/emerald/live-traffic.html, pp. 1-16.

Raynaud et al., Integrated Network Management IV, 1995, Proceedings of the 4th International Symposium on Integrated Network Management, pp. 1-2 and 5-16.

Heberlein et al., A Method to Detect Intrusive Activity in a Networked Environment, Oct. 1-4, 1991, 14th National Computer Security Conference, Washington, D.C. pp. 362-363 and 365-371.

Ko et al., Execution Monitoring of the Security-Critical Programs in Distributed Systems: A Specification-Based Approach, 1997, Proceedings of the 1997 IEEE Symposium on Security and Privacy, pp. 175-187.

Crosbie et al., Active Defense of a Computer System Using Autonomous Agents, Technical Report No. 95-008, Feb. 15, 1995, Purdue University, West Lafayette, Indiana, pp. 1-14.

Mansouri-Samani et al., Monitoring Distributed Systems, Nov. 1993, IEEE Network, pp. 20-30.

Jakobson et al., Alarm Correlation, Nov. 1993, IEEE Network, pp. 52-59.

Anderson et al., Next Generation Intrusion Detection Expert (NIDES), A Summary, May 1995, SRI International, pp. 1-37.

Veritas Software, Press Release, Robust Enhancements in Version 6.0 Maintain Seagate WI as the De Facto Standard for Software Distribution, Oct. 6, 1997, Press Release, pp. 1-4, http://216.239.39.104/search?q=cache:HS9kmK1m2QoJ:www.veritas.com/us/aboutus/pressroom/199 . . . .

Yasin, Network-Based IDS are About to Stop Crying Wolf, Security Mandate: Silence False Alarms, Apr. 9, 1999, http://lists.jammed.com/ISN/1999/04/0021.html, pp. 1-3.

Internet Security Systems, Press Release, ISS Reports Record Revenues and Net Income for Second Quarter, Jul. 19, 1999, http://bvlive01.iss.net/issEn/delivery/prdetail.jsp?type=Financial&oid=14515, pp. 1-5.

LaPadula, State of the Art in CyberSecurity Monitoring, A Supplement, Sep. 2001, Mitre Corporation, pp. 1-15.

Balasubramaniyan et al., An Architecture for Intrusion Detection Using Autonomous Agents, Jun. 11, 1998, Purdue University, West Lafayette, Indiana, pp. 1-4. http://gunther.smeal.psu.edu/images/b9/f3/bb/9e/ba7f39c3871dcedeb9abd0f70cb84607/1.png.

Crosbie et al., Active Defense of a Computer System Using Autonomous Agents, Feb. 15, 1995, Technical Report No. 95-008, Purdue University, West Lafayette, Indiana, pp. 1-14.

Crosbie et al., Defending a Computer System Using Autonomous Agents, Mar. 11, 1994, Technical Report No. 95-022, Purdue University, West Lafayette, Indiana, pp. 1-11.

Denning, An Intrusion-Detection Model, Feb. 1987, IEEE Transactions on Software Engineering, vol. SE-13, No. 2, pp. 1-17.

Lunt, A Survey of Intrusion Detection Techniques, 1993, Computers & Security, 12 (1993), pp. 405-418.

Porras et al., Penetration State Transition Analysis A Rule-Based Intrusion Detection Approach, 1992, pp. 220-229.

Javitz et al., The NIDES Statistical Component: Description and Justification, SRI International, Menlo Park, California, SRI Project 3131, Mar. 7, 1994.

Lindqvist et al., Detecting Computer and Network Misuses Through the Production-Based Expert System Toolset (P-BEST), Oct. 25, 1998, pp. 1-20.

Javitz et al., The SRI IDES Statistical Anomaly Detector, SRI Internationa, Menlo Park, California, May 1991, IEEE Symposium on Security and Privacy, pp. 1-11.

Porras et al., Live Traffic Analysis of TCP/IP Gateways, Nov. 10, 1997, SRI International, Menlo Park, California, pp. 1-16.

Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.

Information & Computing Sciences: System Design Loboratory: Programs: Intrusion Detection, SRI International, http://www.sdl.sri.com/programs/intrusion/, Jun. 17, 2004, pp. 1-2.

Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference pp. 1-12.

Almgren et al., Applications-Integrated Data Collection for Security Monitoring, Oct. 10-12, 2001, SRI International Menlo Park, California, pp. 1-15.

Debar et al., Research Report: A Revised Taxonomy for Intrusion-Detection Systems, Oct. 25, 1999, IBM Research, Switzerland, pp. 1-23.

Porras et al., Emerald: Event Monitoring Enabling Responses to Anomalous Live Disturbances, Computer Science Laboratory, SRI International, Menlo Park, CA, Dec. 18, 1996, pp. 1-3.

Frequently-Asked Questions about RealSecure, pp. 1-14, http://web.archive.org/web/19970721183227/iss.net/prod/rs_faq.html. Mar 30, 1997.

Cisco Systems, Inc., Empowering the Internet Generation, 1998.

Internet Security Systems, Inc., RealSecure Release 1.2 for UNIX, A User Guide and Reference Manual, 1997.

Internet Security Systems, Inc., Real-time attack recognition and response: A solution for tightening network security, Jan. 1997, pp. 1-13.

Internet Security Systems, Inc., SAFEsuite Decisions User Guide, Version 1.0, 1998, pp. 1-78.

NetworkICE Corporation, ICEcap Administrator's Guide, Version 1.0 BETA, 1999, pp. 1-142.

Debar, Herve et al., A Neural Network Component for an Intrusion Detection System, 1992, pp. 240-250.

SRI International, A Prototype IDES: A Real-Time Intrusion-Detection Expert System, Aug. 1987, p. 1-63.

SRI International, Requirements and Model for IDES-A Real-Time Intrusion-Detection Expert System, Aug. 1985, pp. 1-70.

SRI International, An Intrusion-Detection Model, Nov. 1985, pp. 1-29.

Dowell, et al., The ComputerWatch Data Reduction Tool, Proc. of the 13th National Computer Security Conference, Washington, D.C., Oct. 1990, pp. 99-108.

Fox et al., A Neural Network Approach Towards Intrusion Detection, Jul. 2, 1990, pp. 125-134.

Garvey et al., Model-Based Intrusion Detection, Oct. 1991, pp. 1-14.

Ilgun et al., State Transition Analysis: A Rule-Based Intrusion Detection Approach, Mar. 1995, pp. 181-199.

Javitz et al., The SRI IDES Statistical Anomaly Detector, May 1991, pp. 1-11.

SRI International, The NIDES Statistical Component Description and Justification, Mar. 7, 1994, pp. 1-46.

Karen, Oliver, PC Magazine, The Digital Doorman, Nov. 16, 1999, p. 68.

Liepins et al., Anomaly Detection: Purpose and Frameowrk, 1989, pp. 495-504.

Lindqvist et al., Detecting Computer and Network Misuse Through the Production-Bases Expert System Toolset (P-BEST), Oct. 25, 1998, pp. 1-20.
Lunt, Teresa, A survey of intrusion detection techniques, 1993, pp. 405-418.
Lunt, Teresa, Automated Audit Trail Analysis and Intrusion Detection: A Survey, Oct. 1988, pp. 1-8.
Porras et al., Penetration State Transition Analysis A Rule-Based Intrusion Detection Approach, 1992, pp. 220-229.
Sebring et al., Expert Systems in Intrusion Detection: A Case Study, Oct. 1988, pp. 74-81.
Shieh et al., A Pattern-Oriented Intrusion-Detection Model and Its Applications, 1991, pp. 327-342.
Smaha, Stephen, Haystack: An Intrusion Detection System, 1988.
Snapp, Steven Ray, Signature Analysis and Communication Issues in a Distributed Intrusion Detection System, 1991, pp. 1-40.
Porras et al., EMERALD: Event Monitoring Enabling Responses to Anomalous Live Disturbances, Oct. 1997, pp. 353-365.
Lunt et al., Knowledge-Based Intrusion Detection, Mar. 1989, pp. 102-107.
Lunt et al., An Expert System to Classify and Sanitize Text, Dec. 1987, pp. 1-5.
Tener, William, Computer Security in the Age of Information, AI & 4GL: Automated Detection and Investigation Tools, 1989, pp. 23-29.
Teng et al., Adaptive Real-time Anomaly Detection Using Inductively Generated Sequential Patterns, 1990, pp. 278-284.
Vaccaro et al., Detection of Anomalous Computer Session Activity, 1989, pp. 280-289.
Winkler, J.R., A UNIX Prototype and Intrusion and Anomaly Detection in Secure Networks, 1990, pp. 115-124.
Boyen et al. Tractable Inference for Complex Stochastic Process, Jul. 24-26, 1998.
Copeland, Observing Network Traffic—Techniques to Sort Out the Good, the Bad, and the Ugly, 2000, pp. 1-7.
Goan, Terrance, Communications of the ACM, A Cop on the Beat Collecting and Appraising Intrusion Evidence, Jul. 1999, pp. 47-52.
Heberlein et al., A network Security Monitor, 1990, pp. 296-304.
Jackson et al., An Expert System Applications for Network Intrusion Detection, Oct. 1991, pp. 1-8.
Lankewicz et al., Real-Time Anomaly Detection Using a Nonparametric Pattern Recognition Approach, 1991, pp. 80-89.
Lippmann et al., Evaluating Intrusion Detection Systems: The 1998 DARPA Off-line Intrusion Detection Evaluation, 1999.
Munson et al., Watcher: The Missing Piece of the Security Puzzle, Dec. 2001.
Pearl, Judea, Probabilistic Reasoning in Intelligent Systems: Networks of Plausible Inference, Sep. 1988.
Porras et al., Live Traffic Analysis of TCP/IP Gateways, Dec. 12, 1997, pp. 1-13.
EMERALD TCP Statitical Analyzer 1998 Evaluation Results, http://www.sdl.sri.com/projects/emerald/98-eval-estat/index.html, Jul. 9, 1999, pp. 1-15.
Staniford-Chen, GrIDS-A Graph Based Intrusion Detection System for Large Networks, Oct. 1996.
Tener, William, Discovery: An Expert System in the Commercial Data Security Environment, Dec. 1986, pp. 45-53.
Valdes et al., Adaptive, Model-Based Monitoring for Cyber Attack Detection, 2000, pp. 1-19.
SRI International, Blue Sensors, Sensor Correlation, and Alert Fusion, Oct. 4, 2000.
Valdes et al., Statistical Methods for Computer Usage Anomaly Detection Using NIDES, Jan. 27, 1995, pp. 306-311.
Wimer, Scott, The Core of CylantSecure, http://www.cylant.com/products/core.html, 1999, pp. 1-4.
Zhang et al., A Hierarchical Anomaly Network Intrusion Detection System using Neural Network Classification, Feb. 2001.
Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.
Linux Weekly News, http://lwn.net/1998/0910shadow.html, Sep. 8, 1998, pp. 1-38.
Cracker Tracking: Tighter Security with Intrucsion Detection, http://www.bvte.com/art/9805/sec20/art1.htm, Mar 1998, pp. 1-8.
Cisco Systems, Inc., Network RS: Intrusion Detection and Scanning with Active Audit Session 1305, 1998.
Business Security Advisor Magazine, Intrusion Detection Systems: What You Need to Know, http://advisor.com/doc/0527, Sep. 1998, pp. 1-7.
Garvey et al., An Inference Technique for Integrating Knowledge from Disparate Sources, Multisensor Integration and Fusion for Intelligenct Machines and Systems, 1995, pp. 458-464.
Power et al.; CSI Intrusion Detection System Resource, Jul. 1998, pp. 1-7.
Cisco Systems, Inc., NetRanger User's Guide Version 2.1.1, 1998.
Internet Security Systems, Real-Time Attack Recognition and Response: A Solution for Tightening Network Security, http://www.iss.net, 1997, pp. 1-13.
Network ICE Corporation Network ICE Product Documentation, pp. 1-3, http://www.web.archive.org/web/20011005080013/www.networkice.com/support/documentation.html, Jul. 6, 2004.
Network ICE Corporation, Network ICE Documentation, p. 1, http://www.web.archive.org/web/19991109050852/www.networkice.com/support/docs.htm, Jul. 6, 2004.
Network ICE Corporation, Network ICE Press Releases, p. 1, http://www.web.archive.org/web/19990903214428/www.netice.com/company/pressrelease/press.htm, Jul. 7, 2004.
Network ICE Corporation, Network ICE Press Releases, p. 1, http://www.web.archive.org/web/20000304074934/www.netice.com/company/pressrelease/press.htm, Jul. 7, 2004.
Brentano et al., An Architecture for Distributed Intrusion Detection System, Department of Energy Computer Security Group, 14th Annual Conference Proceedings, pp. (17)25-17(45), May 1991.
Stainford-Chen et al., GrIDS—A Graph Based Intrusion Detection System for Large Networks, University of California, Davis, California, 19th National Information Systems Security Conference, 1996, pp. 1-10.
Ricciulli et al., Modeling Correlated Alarms in Network Management Systems, SRI International, Menlo Park, California, , Proceedings of the Conference on Communication Networks and Distributed System Modeling and Simulation, 1997, pp. 1-8.
Porras et al., Emerald: Event Monitoring Enabling Responses to Anomalous Live Disturbances, SRI International, Menlo Park, California, 20th National Information Systems Security Conference, Oct. 1997, pp. 1-24.
Porras et al., A Mission-Impact Based Approach to INFOSEC Alarm Correlation, SRI International, Menlo Park, California, Oct. 2002, pp. 1-33.
Phrack 55 Download (234 kb, Sep. 9, 1999), http://www.phrack.org/show.php?p=55&a=9, pp. 1-6.
Porras et al., A Mission-Impact-Based Approach to INFOSEC Alarm Correlation, SRI International, Menlo Park, California, Oct. 2002, pp. 1-19.
Bace, An Introduction to Intrusion Detection and Assessment for System and Network Security Management, 1999, pp. 1-38.
Huntemar., Automated Information System—(AIS) Alarm System, University of California, Los Alamos National Laboratory, 20th National Information System Security Conference, Oct. 1997, pp. 1-12.
Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.
Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=/infosecprodsservices/b . . . .
Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.
Lunt et al., Knowledge-Based Intrusion Detection, SRI International, Menlo Park, California, Conference on AI Systems in Government, Washington, D.C., Mar. 1989, pp. 102-107.
A. Information Assurance BAA 98-34 Cover Sheet, SRI International, Nov. 1, 2000, pp. 2-35.

NetScreen Products, FAQ, http://www.netscreen.com/products/faq.html, Feb. 28, 2003, pp. 1-6.

Miller, A Network Under Attack: Leverage Your Existing Instrumentation to Recognize and Respond to Hacker Attacks, NetScout Systems, Westford, MA, Apr. 2003, pp. 1-8.

Technology Brief: Intrusion Detection for the Millennium, Internet Security Systems, 2000, pp. 1-6.

Weiss et al., Analysis of Audit and Protocol Data using Methods from Artificial Intelligence, Siemens AG, Munich, Germany, Proc. of the 13th National Computer Security Conference, Washington, D.C., Oct. 1990, pp. 109-114.

Snapp et al., DIDS (Distributed Intrusion Detection System)—Motivation, Architecture, and an Early Protype), University of California, Davis California, , Proc. 14th National Computer Security Conference, Washington, D.C., Oct. 1991, pp. 167-176.

Internet Security Systems, Inc., SAFEsuite Enterprise Edition, Project "Gatekeeper" 1.0, Market Requirements Document, Mar. 30, 1998, pp. 1-12.

Internet Security Systems, SAFEsuite Decisions, 2000, pp. 1-2.

Internet Security Systems, Dynamic Threat Protection, Presse-Roundtable, Munich, Germany, Apr. 10, 2003, pp. 1-63.

Internet Security Systems, Preliminary ODM 1.0 Functional Specification, Aug. 1997, pp. 1-7.

Internet Security Systems, Inc., Scanner-ISSDK Interface, Design Specification, Jun. 2, 2000, Draft 1.07, pp. 1-7.

RealSecure, Adaptive Network Security Manager Module Programmer's Reference Manual, pp. 1-74.

Advanced Concept Technology Demonstrations (ACTD), 2005, pp. 1-28.

Frank, Sounding the Alarm, Sep. 6, 1999, Federal Computer Week, pp. 1-2.

Crumb, Intrusion Detection Systems to be Integrated at AFRL, Air Force Research Laboratory, News@AFRL, Fall 1999, p. 1.

Temin, Case Study: The IA: AIDE System at Two, 15th Annual Computer Security Applications Conference, Dec. 6-10, 1999, Phoenix, Arizona, pp. 1-26.

Spink, Automated Intrusion Detection Environment (AIDE), Intrusion Detection Sensor Fusion, Sep. 7, 1999, pp. 1-25.

Frincke et al., A Framework for Cooperative Intrusion Detection, 21st National Information Systems Security Conference, Oct. 6-9, 1998, Crystal City, Virginia, pp. 1-20.

Anderson et al., In Athena's Camp: Preparing for Conflict in the Information Age, An Exploration of Cyberspace Security R&D Investment Strategies for DARPA: The Day After-in Cyberspace II, Chaper Eleven, 1996, pp. 253-271.

Valdes et al., SRI International, Probabilistic Alert Correlation, 2001, pp. 1-15.

Bass, Multisensor Data Fusion for Next Generation Distributed Intrusion Detection Systems, Apr. 28, 1999, Iris National Symposium, pp. 1-6.

Perrochon et al., Enlisting Event Patterns for Cyber Battlefield Awareness, No Date, Stanford University, pp. 1-12.

Perrochon, Using Context-Based Correlation in Network Operations and Management, Jul. 2, 1999, Stanford University, pp. 1-20.

Perrochon, Real Time Event Based Analysis of Complex Systems, Jun. 1998, pp. 1-9.

Luckham et al., Complex Event Processing in Distributed Systems, Aug. 18, 1988, Stanford University, pp. 1-26.

Pettigrew, US Southcom United States Southern Command's Information Sharing Projects, Summer 1999, IAnewsletter, vol. 3, No. 1, pp. 1-24.

Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.

Cheung et al., The Design of GrIDS: A Graph-Based Intrusion Detection System, Jan. 26, 1999, University of California, pp. 1-51.

Cohen et al., Report of the Reporting and Analysis Track, Detection of Malicious Code, Intrusions, and Anomalous Activities Workshop, Feb. 22-23, 1999, pp. 1-47.

Garofalakis et al., Network Mining and Analysis: The Nemesis Project, Bell Labs, Lucent Technologies, No Date, pp. 1-12.

RealSecure ICEcap Manager User Guide Version 3.6, Internet Security Systems, Inc., 1998-2002, pp. 1-228.

Cuppens, Cooperative Intrusion Detection, Date Unknown, pp. 1-10.

Mukherjee et al., Network Intrusion Detection, IEEE Network May/Jun. 1994, pp. 26-41.

Machlis, Net Monitoring Tools Gain Real-Time Alerts, Apr. 14, 1997, http://www.computerworld.com, pp. 1-12.

OmniGuard/ITA Intruder Alert, AXENT Technologies, Inc., Nov. 17, 2004, http://www.web.archive.org, pp. 1-10.

NetRanger Overview, Chapter 1, Date Unknown, pp. 1-16.

Sutterfield, Large-Scale Network Intrusion Detection, 1997, WheelGroup Corporation, pp. 1-10.

Kumar et al., An Application of Pattern Matching in Intrusion Detection, Technical Report No. CSD-TR-94-013, Jun. 17, 1994, Purdue University, pp. 1-55.

Huang et al., A Large-Scale Distributed Intrusion Detection Framework Based on Attack Strategy Analysis, Date Unknown, The Boeing Company, pp. 1-12.

Perrochon et al., Event Mining with Event Processing Networks, Date Unknown, Stanford University, pp. 1-4.

Gruschke, Integrated Event Management: Event Correlation Using Dependency Graphs, presented at DSOM 1998, University of Munich, pp. 1-12.

Bass, Intrusion Detection System and Multisensor Data Fusion, Apr. 2000, Communications of the ACM, vol. 43, No. 4, pp. 99-105.

Bass et al., A Glimpse into the Future of ID, Date Unknown, Usenix, pp. 1-10.

Lapadula, State of the Arts in Anomaly Detection and Reaction, Jul. 1999, Mitre Corporation, pp. 1-36.

Rationalizing Security Events with Three Dimensions of Correlation, Date Unknown, NetForensics, Tech Brief, pp. 1-6.

Jou et al., Design and Implementation of a Scalable Intrusion Detection System for the Protection of Network Infrastructure, Date Unknown, MCNC, pp. 1-15.

Caldwell, Event Correlation: Security's Holy Grail?, Aug. 1, 2002, GuardedNet, pp. 1-21.

Metcalf et al., Intrusion Detection System Requirements, Sep. 2000, Mitre Corporation, pp. 1-33.

Jou et al., Architecture Design of a Scalable Intrusion Detection System for the Emerging Network Infrastructure, Technical Report CDRL A005, Apr. 1997, MCNC, pp. 1-42.

Security Manager for UNIX Systems Version 3.2.1 User's Guide, Feb. 1998, Internet Security Systems, pp. 1-162.

RealSecure Release 1.2 for UNIX A User Guide and Reference Manual, 1997, Internet Security Systems, Inc., pp. 1-92.

Internet Scanner SAFE SAFEsuite 4.0 User Guide and Reference Manual, 1996, Internet Security Systems, Inc., pp. 1-158.

Internet Scanner 3.3 User Guide and Reference Manual, 1996, Internet Security Systems, Inc., pp. 1-119.

Landwehr et al., Newsletter of the IEEE Computer Society's TC on Security and Privacy Electronics, Electronic CIPHER, Nov. 25, 1997, Issue 25, pp. 1-34.

20th National Information Systems Security Conference, Oct. 6-10, 1997, Baltimore, Maryland, pp. 1-44.

EMERALD Alert Management Interface User's Guide Version 1.2, Dec. 6, 2000, SRI International, pp. 1-11.

Anderson et al., Detecting Unusual Program Behavior Using the Statistical Component of the Next-Generation Intrusion Detection Expert System (NIDES), May 1995, SRI International, pp. 1-89.

Lunt et al., Detecting Intruders in Computer Systems, 1993 Conference on Auditing and Computer Technology, SRI International, pp. 1-17.

Network ICE Products—ICEcap, Date Unknown, pp. 1-2.

Forlanda, The Secrets to Driving on BlackICE, Jan. 12, 2000, Network ICE, pp. 1-35.

BlackICE User's Guide Version 1.0 Beta Draft, 1999, Network ICE Corporation, pp. 1-59.

ICEcap Administrator's Guide Version 1.0 Beta Draft, 1999, Network ICE Corporation, pp. 1-25.

Shulak et al., ICEcap Advanced Administration Guide Version 3.0, 2001, Internet Security Systems Corporation, pp. 1-51.

"Real Secure, OS Sensor User Guide," Version 5.0, © Internet Security Systems, Inc. 1997-2000; Sep. 2000, pp. 1-64.

"Real Secure, User's Guide," Version 3.0, © 1992-1998, Internet Security Systems, Inc., pp. 1-128.

"System Security Scanner, User Guide," Version 1.6, © 1996-1998, Internet Security Systems, Inc., pp. 1-164.

"Real Secure™, Network Engine User Guide," Version 3.2.1, © 1999 by Internet Security Systems, Inc., pp. 1-38.

"Real Secure™, User Guide," Version 3.2.1, © 1999 by Internet Security Systems, Inc., pp. 1-38.

"Real Secure™, Manager for HP OpenView User Guide," Version 1.3, © 1999 by Internet Security Systems, Inc., pp. 1-48.

"Database Scanner, User Guide," Version 2.0, © 1992-1999, Internet Security Systems, Inc., pp. 1-112.

"Database Scanner™, User Guide" Version 4.0, © 2000 by Internet Security Systems, Inc., pp. 1-122.

"Database Scanner™, User Guide," Version 3.0.1, , © 1999 by Internet Security Systems, Ind., pp. 1-164.

"Real Secure™, Network Sensor User Guide," Version 5.0, © 2000 by Internet Security Systems, Inc., pp. 1-42.

"Real Secure, Server Sensor User Guide," Version 5.5, © Internet Security Systems, Inc. 2000, pp. 1-56.

"Internet Scanner™, User Guide," Version 6.0, Copyright © 1999 by Internet Security Systems, Inc., pp. 1-182.

"Internet Scanner™, User Guide," Version 6.1, © 2000 by Internet Security Systems, Inc., pp. 1-226.

"Internet Scanner™, User Guide," Version 5.6, © 1992-1998, Internet Security Systems, Inc., pp. 1-162.

"Internet Scanner™, User Guide," Version 5.3, © 1992-1998, Internet Security Systems, Inc. pp. 1-173.

"Real Secure, Console User Guide," Version 5.5, © 199?-2000, Internet Security Systems, Inc., pp. 1-162.

"Internet Scanner™, User Guide," Version 5.8, © 1999 by Internet Security Systems, Inc., pp. 1-148.

"SAFEsuite Decisions, User Guide," Version 1.0, © 1992-1998, Internet Security Systems, Inc., pp. 1-88.

"Real Secure™, Console User Guide," Version 5.0, © 2000 by Internet Security Systems, Inc., pp. 1-114.

"SAFEsuite DECISIONS, User Guide," Version 2.5, © 2000 by Internet Security Systems, Inc., pp. 1-194.

"System Scanner, User Guide," Version 1.7, © 1992-1998, Internet Security Systems, Inc., pp. 1-248.

"Sytem Scanner, User Guide," Version 1.0, © 1996-1998, Internet Security Systems, Inc., pp. 1-140.

"System Scanner™, User Guide," Version 4.0, © 1999 by Internet Security Systems, Inc., pp. 1-178.

Internet Security Systems, Inc., "Introduction to RealSecure Version 5.0, The Industry's Only Integrated Host-Based and Network-Based Intrusion Detection System", Aug. 22, 2000, pp. 1-47.

Internet Security Systems, Inc., "RealSecure Network Sensor and Gigabit Network Sensor Policy Guide Version 7.0", Aug. 2003, pp. 1-86.

Internet Security Systems, Inc., "RealSecure Console User Guide Version 3.1", Jun. 1999, pp. 1-98.

Internet Security Systems, Inc., "RealSecure Version 2.0", Apr. 1998, pp. 1-154.

Internet Security Systems, Inc., "Enhanced Dynamic Threat Protection via Automated Correlation and Analysis", an ISS White Paper, 2002, pp. 1-14.

Internet Security Systems, Inc., "RealSecure Site Protector Comparison Guide for Internet Scanner 7.0 Reporting Version 1.2", Mar. 2003, an ISS Tech Note, pp. 1-15.

Internet Security Systems, Inc., "RealSecure Site Protector Comparison Guide for ICEcap Manager Version 1.5", Jan. 2002, an ISS Technical White Paper, pp. 1-27.

Internet Security Systems, Inc., "RealSecure SiteProtector Security Fusion Module 2.0 Frequently Asked Questions", Mar. 2003, pp. 1-8.

Internet Security Systems, Inc., "RealSecure SiteProtector Console User Reference Guide Version 2.0 Service Pack 1", Mar. 14, 2003, Chapter 3, pp. 1-27.

Internet Security Systems, Inc., "Proventia Gateway and Network Protection", Jul. 2003, pp. 1-12.

Farley, Internet Security System, Inc., "ID Fusion Technology, A First-Generation Approach", Apr. 29, 1999, National Security Framework Forum, pp. 1-8.

Farley, "RealSecure Fusion Engine Concepts", an ISS White Paper, Jun. 30 ,1999, pp. 1-23.

McGraw et al., "Secure Computing with Java: Now and the Future", 1997, http://java.sun.com/security/javaone97-whitepaper.html, pp. 1-20.

Internet Security Systems, Inc., SAFEsuite Enterprise Edition, Project "Gatekeeper" 1.0, Market Requirements Document, Mar. 30, 1998, pp. 1-12.

Internet Security Systems, SAFEsuite Decisions, 2000, pp. 1-2.

Internet Security Systems, Dynamic Threat Protection, Presse-Roundtable, Munich, Germany, Apr. 10, 2003, pp. 1-63.

Internet Security Systems, Preliminary ODM 1.0 Functional Specification, Aug. 1997, pp. 1-7.

Internet Security Systems, Inc., Scanner-ISSDK Interface, Design Specification, Jun. 2, 2000, Draft 1.07, pp. 1-7.

Advanced Concept Technology Demonstrations (ACTD), 2005, pp. 1-28.

Frank, Sounding the Alarm, Sep. 6, 1999, Federal Computer Week, pp. 1-2.

Crumb, Intrusion Detection Systems to be Integrated at AFRL, Air Force Research Laboratory, News@AFRL, Fall 1999, p. 1.

Temin, Case Study: The IA: AIDE System at Two, 15th Annual Computer Security Applications Conference, Dec. 6-10, 1999, Phoenix, Arizona, pp. 1-26.

Spink, Automated Intrusion Detection Environment (AIDE), Intrusion Detection Sensor Fusion, Sep. 7, 1999, pp. 1-25.

Frincke et al., A Framework for Cooperative Intrusion Detection, 21st National Information Systems Security Conference, Oct. 6-9, 1998, Crystal City, Virginia, pp. 1-20.

Scott Weiss, "Security Strategies—E-Security, Inc., " product brief, Hurwitz Group, Inc., Mar. 24, 2000.

Sean Adee, CISA, "Managed Risk, Enhanced Response—The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

"e.Security—Introducing the First Integrated, Automated, and Centralized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems For Intrusions,"Apr. 3, 2000, Post-Newsweek Business Information, Inc., www.gcn.com.

e.Security™, website pages (pp. 1-83), www.esecurityinc.com, e-Security, Inc., Naples, FL 34103, Sep. 14, 2000.

Musman et al., System or Security Managers Adaptive Response Tool, DARPA Information Survivability Conference and Exposition, Jan. 25, 2000, pp. 56-68.

Gibson Research Corporation Web Pages, Shields Up!—Internet Connection Security Analysis, grc.com/default.htm, Laguna Hills, California, 2000.

* cited by examiner

CONFIGURE SCANS

| Role | Asset Value | Scan Policy |
|---|---|---|
| UnixDesktop | 3 | L3UnixDesktop |
| UnixServer | 4 | L4UnixServer |
| UnixServer | 5 | L5UnixServer |
| UnixServer | 6 | L6UnixServer |
| NTDesktop | 5 | L5NTDesktop |
| NTServer | 5 | L5NTServer |
| SQLServer | 3 | L3SQLServer |
| SystemScanner | 3 | L3SystemScanner |

Mapping from Host Role + Asset Value to a Scan Policy

FIG. 6B

| Asset Value | Frequency |
|---|---|
| 3 | every 5 days |
| 4 | every 4 days |
| 5 | every 3 days |
| 6 | every 2 days |
| 7 | every day |

Mapping from Asset Value to Scan Frequency

FIG. 6C

| Entity | Host | Policy | Scan Frequency | First Job ID | Last Job ID |
|---|---|---|---|---|---|
| Internet Scanner | 127.0.0.1 | L3UnixWebServer | Every 5 days | 1 | 3 |
| Internet Scanner | 135.1.2.3 | L5NTWebServer | Every 2 days | 2 | 3 |
| Database Scanner | 135.1.2.3 | L3SQLServer | Every 5 days | 3 | 4 |
| System Scanner | 127.0.0.1 | L3Unix | Every 5 days | 3 | 3 |

Scan Configuration Table

FIG. 6D

SCHEDULE SCANS

SCHEDULE AUDIT

SHUTDOWN

US 7,340,776 B2

METHOD AND SYSTEM FOR CONFIGURING AND SCHEDULING SECURITY AUDITS OF A COMPUTER NETWORK

PRIORITY AND RELATED APPLICATIONS

The present application claims priority to provisional patent application entitled, "Method and System for Configuring and Scheduling Security Audits of a Computer Network," filed on Jan. 31, 2001 and assigned U.S. application Ser. No. 60/265,519. The present application also references and incorporates herein a related U.S. non-provisional patent application entitled, "Method and System for Calculating Risk Associated with a Security Audit," filed concurrently herewith and having attorney docket number 05456.105036.

TECHNICAL FIELD

The present invention is generally directed to managing the security of a network. More specifically, the present invention facilitates the configuration and scheduling of security audits of machines in a distributed computer network.

BACKGROUND OF THE INVENTION

The security of computing networks is an increasingly important issue. With the growth of wide area networks (WANs), such as the Internet and the World Wide Web, people rely on computing networks to transfer and store an increasing amount of valuable information. This is also true of local area networks (LANs) used by companies, schools, organizations, and other enterprises. LANs are used by a bounded group of people in the organization to communicate and store electronic documents and information. LANs typically are coupled to or provide access to other local or wide area networks. Greater use and availability of computing networks produces a corresponding increase in the size and complexity of computing networks.

With the growth of networks and the importance of information available on the networks, there is also a need for better and more intelligent security. One approach to securing larger and more complex computer networks is to use a greater number and variety of security assessment devices. Security assessment devices can be used to evaluate elements in the network such as desktop computers, servers, and routers, and determine their respective vulnerability to attack from hackers. These network elements are commonly referred to as hosts and the terms "element" and "host" are used interchangeably herein. Security assessment devices can also be used more frequently to monitor the activity or status of the elements in a computing network.

One problem with increasing the number of security assessment devices and the frequency with which they are used is deciding which elements in the network need to be audited, how frequently they should be audited, and what checks need to be run. These are decisions that often involve a variety of complicated factors and they are decisions that in practicality cannot be made every time a security audit is conducted. Increased assessment also produces a corresponding increase in the amount of security data that must be analyzed. A network administrator that is overwhelmed with security data is unable to make intelligent decisions about which security vulnerabilities should be addressed first.

An additional problem associated with maintaining adequate network security is finding the time to conduct security audits. Security audits generally must be initiated by a security professional and can hinder or entirely interrupt network performance for several hours at a time. Furthermore, existing security assessment devices typically perform a variety of security scans on a machine, some of which may not be necessary. These unnecessary scans can translate into additional "down time" for the network.

In view of the foregoing, there is a need in the art for a system which will support the auditing of a distributed computing network. Specifically, a need exists to be able to automatically survey a network and determine the role and value of each element in the network. A further need exists to be able to assess the vulnerability of each element in the network. There is also a need to automatically schedule security auditing based on the vulnerability assessment of each element and to adjust future scheduling as audit data change. In this manner, those elements deemed to have the greatest risk can be monitored more closely. Finally, a need exists to be able to manage and present data pertaining to the survey, the vulnerability assessment, and the scheduling in a convenient graphical format.

SUMMARY OF THE INVENTION

The present invention satisfies the above-described needs by providing a system and method for scheduling and performing security audits in a distributed computing environment. Assessing the security of a relatively large or complex computer network can require hundreds of decisions about the types and timing of security checks. By facilitating the selection and scheduling of security audits, the present invention improves existing network security techniques. The present invention can identify the various elements in a distributed computing network and determine their role and relative importance. Using an element's role and relative importance, a more thorough security audit is chosen and scheduled to be run at an appropriate time. Information from the security audit can be used to calculate a security score and to modify the type and scheduling of future security audits. Security audit information can also be prioritized and presented to a user in a convenient format.

In one aspect, the present invention comprises a method for configuring and scheduling security scans of a computer network. A security audit system can conduct a discovery scan to identify elements that exist in a distributed computing network. Elements typically identified include, but are not limited to, desktop computers, servers, routers, and data storage devices. From the information collected during the discovery scan, the security audit system can determine the operating system and/or services associated with an element. The element's function and importance in the network can be used to configure an audit scan. An audit scan is a more thorough examination than a discovery scan and different types of audit scans involve different types of checks. The security audit system can schedule the selected audit scan to run at a time that will not interrupt the normal functioning of the computer network. The information collected during the audit scan can be used by the security audit system to calculate a security score for each element or group of elements. A security score is useful for identifying and prioritizing vulnerabilities that need to be remedied in the network.

In another aspect, the present invention provides a method for assessing the security of a network using a security audit system. The security audit system can receive information about elements in the network from an initial scan of the network. Using the information, the security audit system can select a more thorough audit scan to perform on a particular network. The selection of the audit scan can be based on the types of checks that need to be made on a particular element. The security audit system can also schedule the audit scan based on information collected during the initial scan. An element with greater importance or more serious vulnerabilities can be scanned more frequently than other elements in the network. Once the audit scan is performed, the security audit system receives more detailed information about the element and a security score can be computed for the element. The security score is useful in assessing the security of the network and prioritizing issues that need to be addressed.

For yet another aspect, the present invention further provides a security audit system for configuring and scheduling security scans of a computer network. The system comprises various types of scanning engines for running different scans and an active scan engine for coordinating the selection and scheduling of the different scans. The security audit system can conduct an initial scan to assess the functions and importance of various elements in the network. The initial scan provides information for deciding when to perform a more thorough audit scan and what type of audit scan to select. A console can also be coupled to the system for communicating information concerning the scans between a user and the security audit system.

These and other aspects of the invention will be described below in connection with the drawing set and the appended specification and claim set.

BRIEF DESCRIPTION OF THE DRAWINGS

FIGS. 6B, 6C, and 6D are exemplary tables associated with configuring scans.

DETAILED DESCRIPTION OF THE EXEMPLARY EMBODIMENTS

Figure 1:
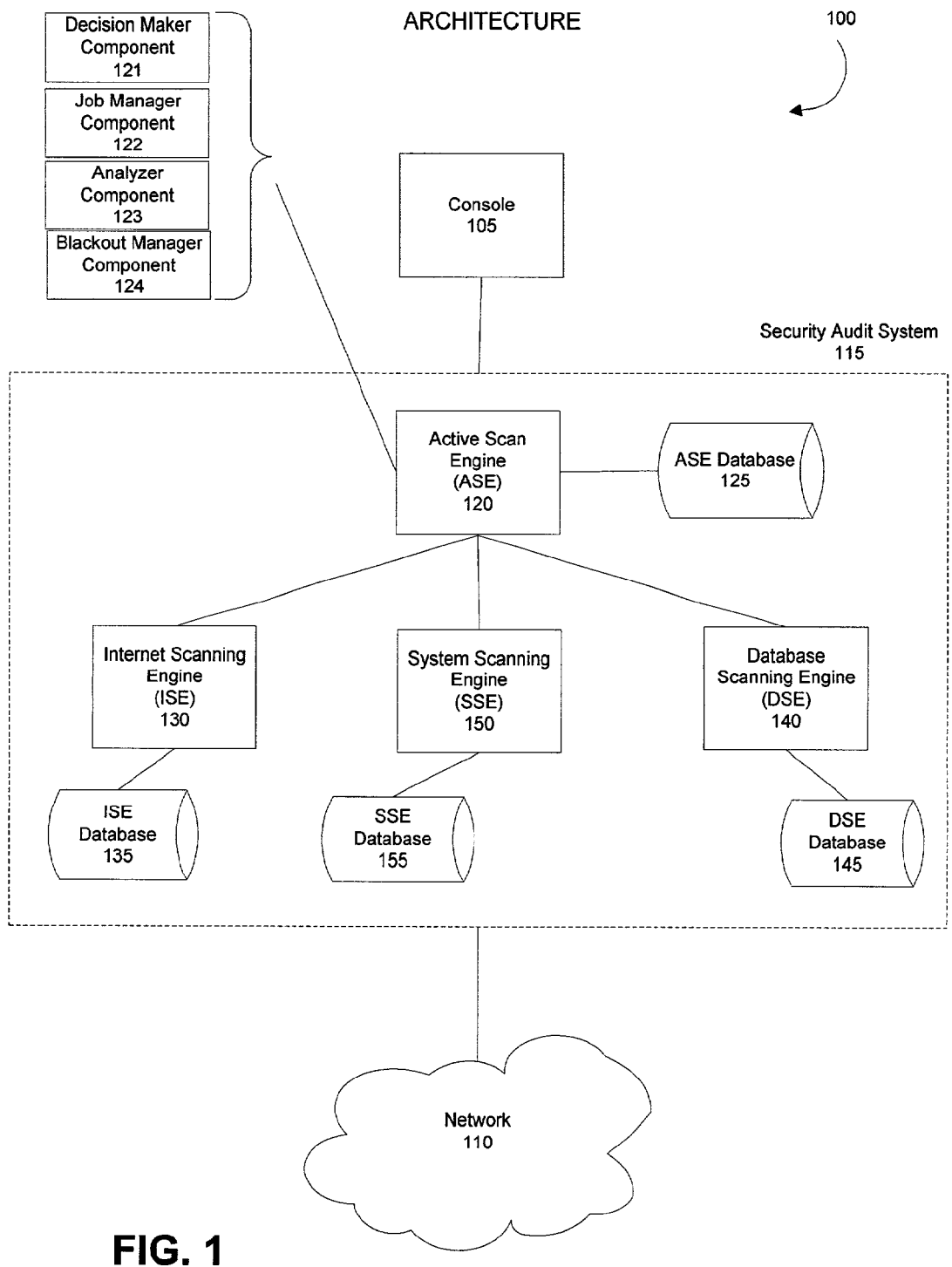
FIG. 1 is a block diagram illustrating an exemplary architecture for operating an embodiment of the present invention.

The present invention supports the automated assessment of the security risks of a computing network. Specifically, the present invention allows a security auditing system to collect initial information about the identity and importance of elements in a computing network. Using this initial information, the invention then provides for automatic selection and scheduling of security audit scans to be performed on the network elements. A user can provide parameters, if so desired, as to when to schedule audit scans and what types of audit scans to run. Taking the information collected from the audit scan, the auditing system can compute a security score for a network element based on its vulnerability and importance. The security score can be presented to the user in a manageable format to facilitate interpretation and response. The user may use the security score as a basis for adjusting the scheduling and configuration of future audit scans.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description that follows is represented largely in terms of processes and symbolic representations of operations in a distributed computing environment by conventional computer components, including database servers, application servers, mail servers, routers, security devices, firewalls, clients, workstations, memory storage devices, display devices and input devices. Each of these conventional distributed computing components is accessible via a communications network, such as a wide area network or local area network.

The processes and operations performed by the computer include the manipulation of signals by a client or server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention also includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and the preferred operating environment will be described.

FIG. 1 illustrates various aspects of an exemplary computing environment in which an embodiment of the present invention is designed to operate. Those skilled in the art will appreciate that FIG. 1 and the associated discussion are intended to provide a brief, general description of the computer network resources in a representative distributed computer environment including the inventive security audit system. The architecture comprises a console 105 and a security audit system 115 which are used to configure and schedule security audits of a network 110. The console 105 communicates information about the current security state of the network 110 to a user. The console 105 typically comprises a graphical user interface for presenting and managing data in a convenient format for the user. The console 105 is also operable for receiving information from the security audit system 115 and allowing control of the security audit system 115. The security audit system 115 comprises an active scan engine 120 and one or more other scan engines. In the exemplary embodiment illustrated in FIG. 1, the active scan engine 120 is coupled to an Internet scanning engine 130, a system scanning engine 150, and a database scanning engine 140. Each of these scan engines illustrated in FIG. 1 is coupled to a corresponding database.

The active scan engine's 120 primary task is acquiring and maintaining current data about the configuration and security posture of the network 110. The active scan engine 120 utilizes the subsidiary scan engines 130, 140 and 150 as a means for gathering information about the network 110. The network 110 typically comprises elements such as desktop computers, routers, and various servers. The active scan engine 120 is responsible for coordinating the configuration, scheduling, and running of scans of these elements found in the network 110. Typically, the active scan engine 120 is continuously running so that the scheduled scans can be run at their designated times, and the resultant data processed in a timely manner.

Figure 2:
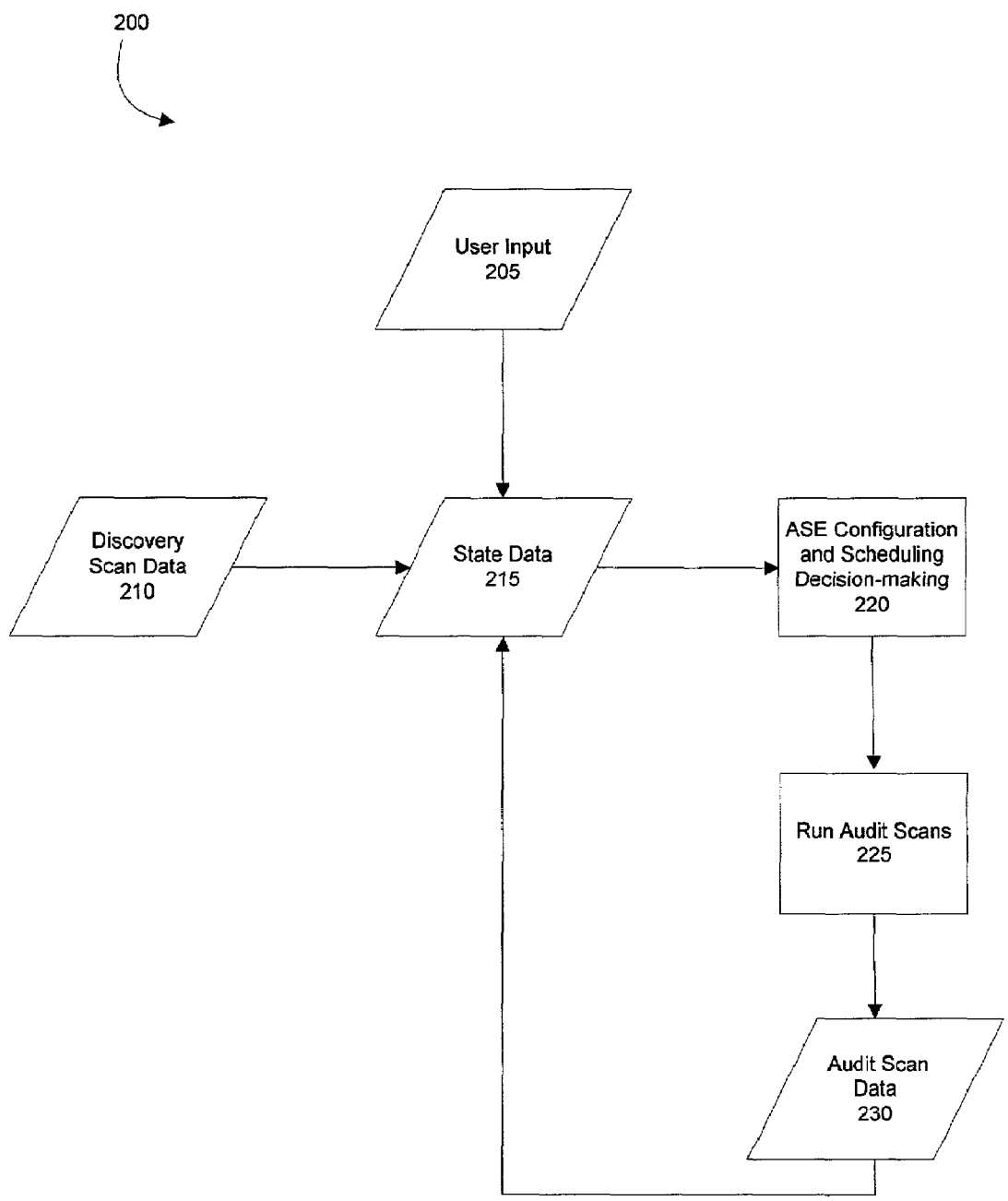
FIG. 2 is a block diagram illustrating an exemplary data flow for a security audit system.

FIG. 2 illustrates a flow chart diagram of an exemplary flow of data for an embodiment of the present invention. Beginning with the user input 205, this represents data that a user may input at the console 105 to be used by the security audit system 115 in configuring and scheduling scans. User input data 205 can include a specific network range in which to conduct scans, fixed asset and vulnerability values, and blackout periods during which security scans should not be run. The user input 205 is combined with data recovered by the discovery scan 210. The discovery scan is an initial scan of the network 110 run by the security audit system 115. The discovery scan is used to identify the elements on the network 110 and to assign asset values to them. An asset value is typically an arbitrary value assigned based on the importance of an element relative to other elements in a network. By identifying the function and asset value of each element on the network, the security audit system 115 can configure and schedule further scans to run on the network 110.

The user input 205 and the discovery scan data 210 are combined to formulate state data 215 describing each of the elements in the network 110. In step 220, the active scan engine 120 makes decisions regarding the types of scans to be run and when they will be run on the network 110. Ultimately, scheduled audit scans will be run against each of the elements on the network 110 in step 225. The audit scan involves a more thorough examination of a network element than the discovery scan. The audit scan data 230 is collected and fed back into the accumulated state data 215 describing each element on the network 110. The feedback mechanism shown in FIG. 2 enables the security audit system 115 to adjust the configuring and scheduling of future audit scans. The exemplary method illustrated in FIG. 2 allows the most important or most vulnerable elements of the network 110 to be given the highest priority in conducting security audits.

Figure 3:
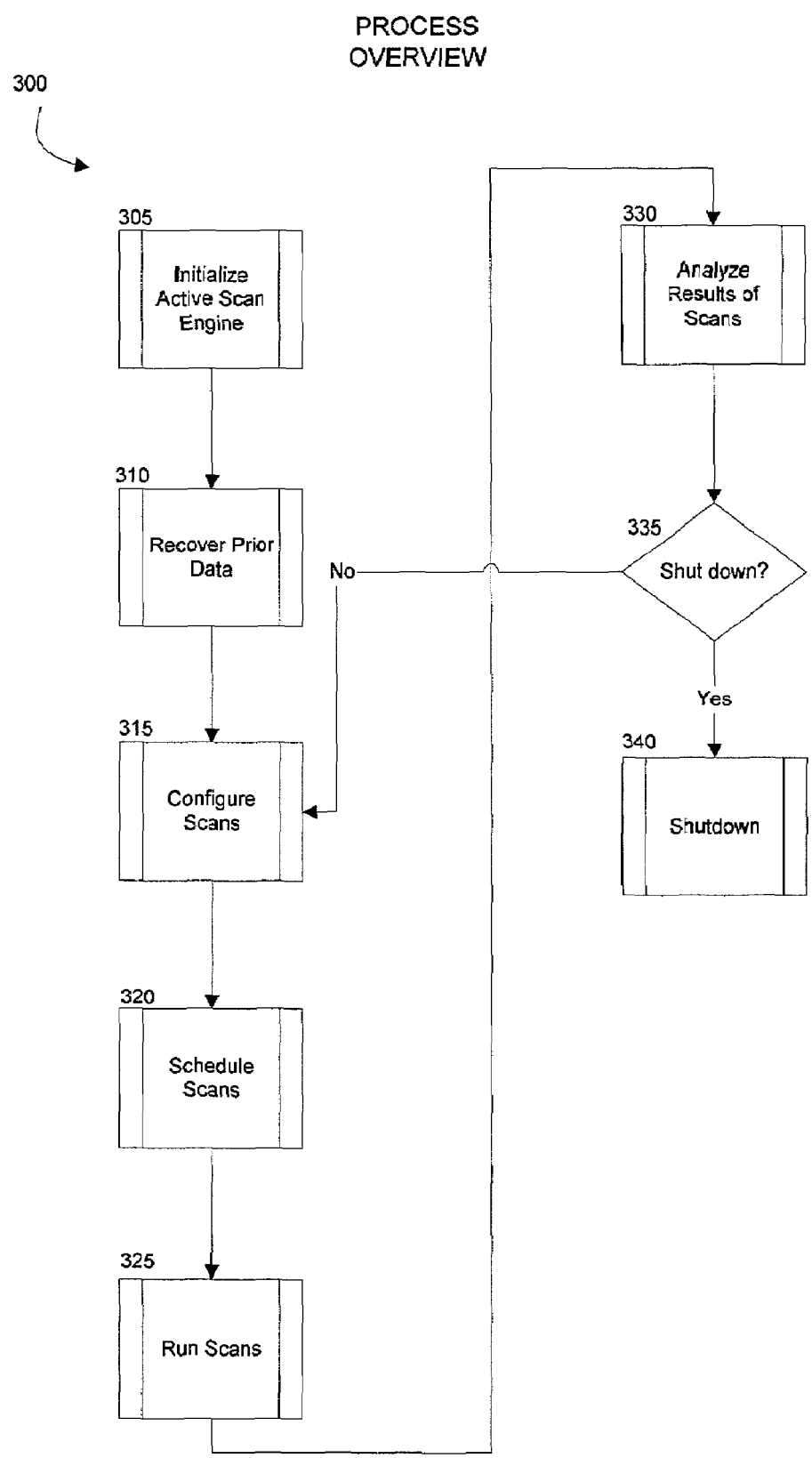
FIG. 3 is a logic flow diagram illustrating an overview of the operating steps performed by a security audit system in accordance with an exemplary embodiment of the present invention.

An exemplary process overview for operating the security audit system 115 is illustrated in FIG. 3. When the security audit system 115 first starts up, a scheduling module with the active scan engine 120 is initialized as shown in step 305 of FIG. 3. The initialization process involves adjusting several modules, which will be discussed in connection with FIG. 4. In step 310, the active scan engine 120 recovers prior data from previous incompletely processed scans. The need to recover prior data results from the active scan engine 120 being shut down when there are scan results pending processing. When a shutdown occurs, any data necessary to recover the current state of the active scan engine 120 is saved to the ASE database 125. Upon startup, the active scan engine 120 recovers and processes any incompletely analyzed data as further illustrated in FIG. 5.

In step 315, the active scan engine 120 configures the scans that are to be run on the network 110. The configuring of scans, discussed in greater detail in connection with FIG. 6, involves determining the type of scan to run on a network host based on its function and asset value. Once it is decided what type of scans will be run in step 315, the active scan engine 120 chooses when to conduct scans on network elements in step 320. The security audit system 115 can make many of the configuration and scheduling decisions that would ordinarily have to be made by the user.

In step 325, the security audit system 115 runs the scheduled scans on the network 110. The first time that a security audit system 115 scans the network 110 it will conduct a discovery scan to identify network elements and their function. The discovery scan collects information for use in subsequent configuring and scheduling of more thorough audit scans. After these scans are performed, the active scan engine 120 analyzes the data that are collected in step 330. The analysis of the data can be used to readjust the configurations and scheduling of scans by returning to step 315. Alternatively, the user can shut down the security audit system 115 in step 340. The security audit system 115 performs tasks asynchronously from the user's perspective. When engaged in a potentially time-consuming task such as the analysis of scan results (step 330), the active component periodically checks for a user-initiated shutdown signal. This allows the security audit system 115 to shut down in a timely manner even when engaged in lengthy tasks. As mentioned above, if a shutdown occurs when the security audit system 115 is engaged upon one or more tasks, sufficient state information is stored to allow for recovery upon reactivation. The foregoing steps are merely an exemplary embodiment of how to use the security audit system 115. In an alternative embodiment of the invention, the foregoing steps may be performed in a different order or certain steps may be skipped entirely.

Figure 4:
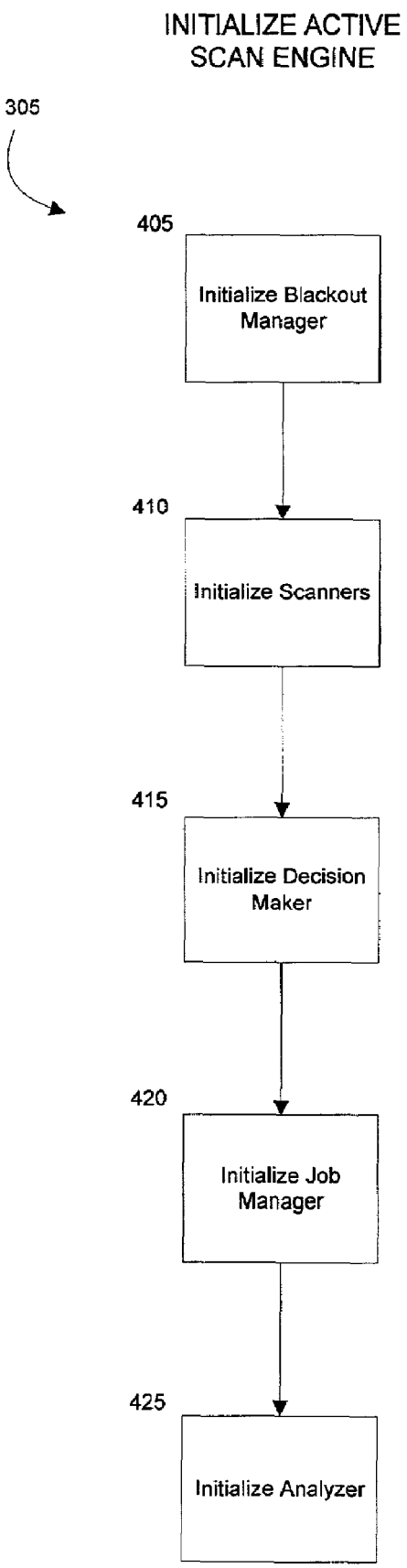
FIG. 4 is a logic flow diagram illustrating an exemplary process for initializing a scheduling module within a security audit system.

FIG. 4 illustrates an exemplary method for initializing the active scan engine 120. In step 405, the active scan engine 120 loads the scan blackout schedule, initializing the blackout manager 124. The scan blackout schedule contains time periods during which scans are not to be performed on the network 110. The scan blackout schedule is typically determined by a user and entered using the console 105. In step 410, the various scanners 130, 140, and 150 are initialized so they will be ready to perform scans on the network 110. The exemplary embodiment described herein discusses three types of scanning engines that can be used to perform a security audit on a network. An alternative embodiment of the present invention may employ a selected subset of these scan engines or other types of scan engines.

The Internet scanning engine 130 is a network scanning tool used to conduct the initial discovery scans performed on the network. The Internet scanning engine 130 can also be used to identify security vulnerabilities that exist across an entire network. The database scanning engine 140 performs audits of database servers identified by the Internet scanning engine 130 during the discovery scan. The system scanning engine 150 is a security auditing tool comprising software that is generally installed on individual hosts in the network. The system scanning engine 150 is typically installed on desktop computers, servers, and routers that have at least a specific asset value. Because they execute on the local host, the system scanning engine 150 is able to detect vulnerabilities that may be unidentifiable by the Internet scanning engine 130. The active scan engine 120 works with the system scanning engine 150 to configure and schedule particular scans to be run on network elements.

In steps 415, 420, and 425, components of the active scan engine 120 are initialized in preparation for conducting scans. Identified in step 415, the decision maker component 121 receives the results of prior audit and discovery scans and determines which audit scans to run on which elements and when to run them. The job manager component 122, initialized in step 420, receives instructions from the decision maker component 121 and monitors what audit scans have been scheduled, when the audit scans have been scheduled, and whether the audit scans are complete.

Finally, in step 425 the analyzer component 123 is initialized so that it can receive and store the results of audit scans such as a network element's functions and vulnerabilities. In alternative embodiments of the present invention, the functions performed by the analyzer component 123, the decision maker component 121, the blackout manager 124, and the job manager component 122 can be performed by other components separate from the active scan engine 120.

Figure 5:
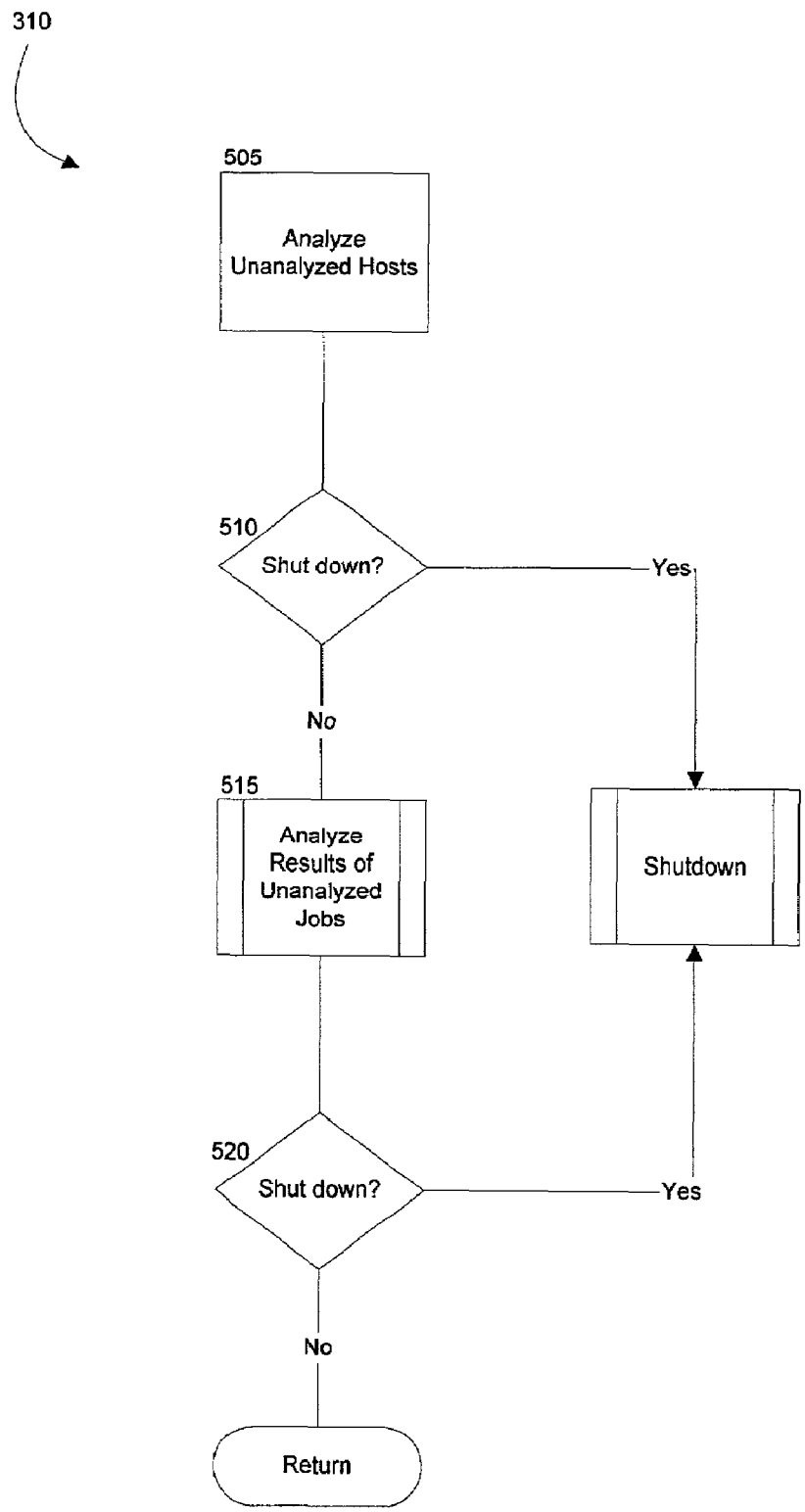
FIG. 5 is a logic flow diagram illustrating an exemplary process for recovering prior data within a security audit system.

FIG. 5. illustrates an exemplary means for recovering prior data as referred to in step 310 of FIG. 3. The purpose of this step is to continue scanning, analysis, or decision-making work that was interrupted during a previous shut down of the security audit system 115. In step 505, analysis is completed of any remaining hosts in the network 110 that have not already been analyzed. In step 510, the active scan engine 120 checks for a user-initiated shutdown of the security audit system 115, or proceeds to step 515 to analyze data remaining from any unprocessed scan jobs. After the prior data has been recovered, the active scan engine 120 once again checks for a user-signaled shutdown in step 520. If a shutdown has been initiated, the active scan engine 120 shuts down; otherwise, it returns to step 315 for adjusting or configuring new scans.

Figure 6A:
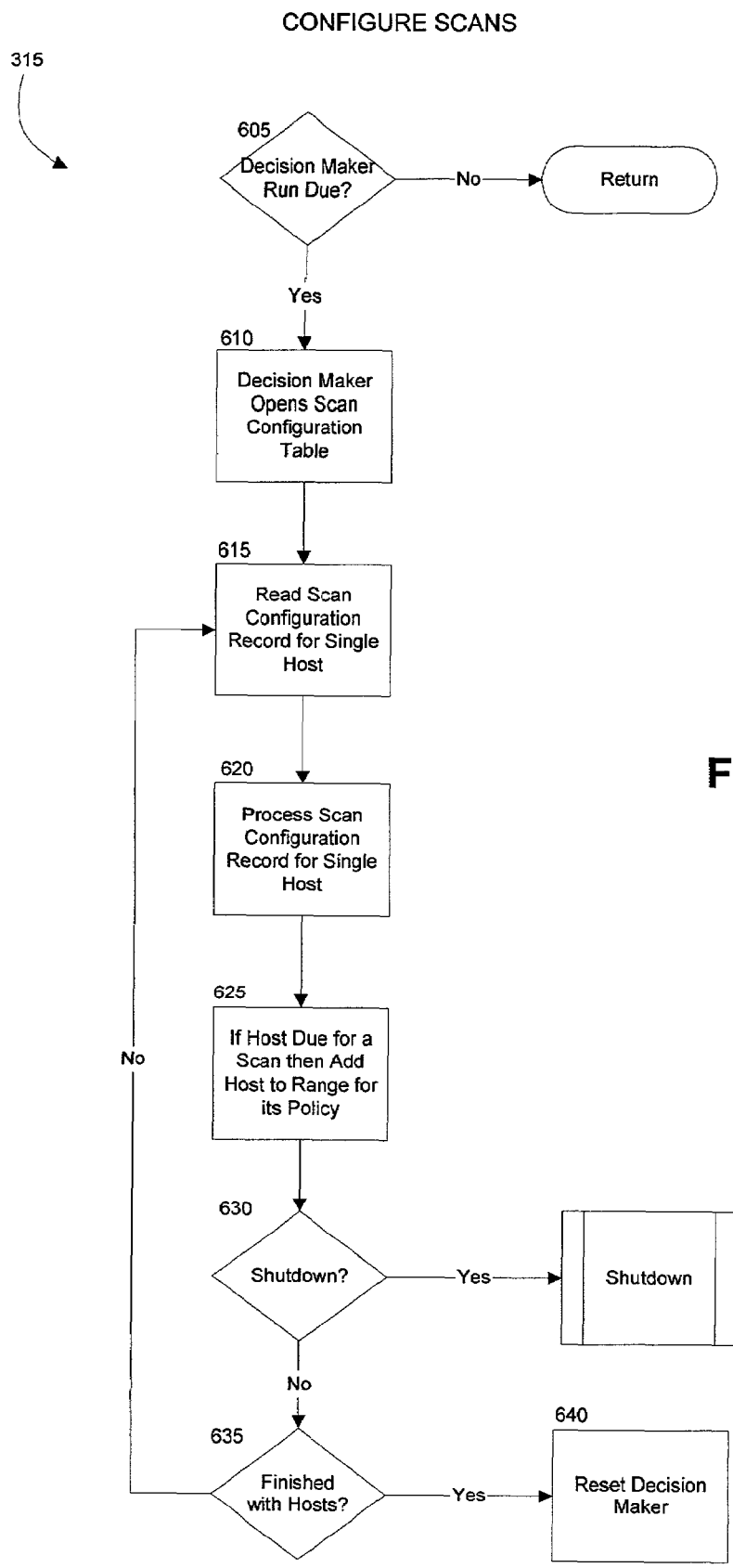
FIG. 6A is a logic flow diagram illustrating an exemplary process for configuring scans with a security audit system.

An exemplary method for configuring scans is illustrated in FIGS. 6A and the accompanying exemplary tables. The first time the security audit system 115 runs on a network 110, a scan configuration table can be created after a discovery scan is performed. Subsequently, the active scan engine 120 stores the scan configuration table and, with each new scan, the table can be updated. Referring to FIG. 6A, in step 605 the active scan engine 120 determines if the decision maker 121 is due to be executed. The decision maker 121 runs periodically, or when a discovery scan finds previously unknown hosts on the network 110. In step 610, the decision maker 121 opens the scan configuration table in the ASE database 125. As shown in an exemplary table in FIG. 6D, the scan configuration table contains the necessary information for configuring and scheduling scans of all known hosts. In step 615, the decision maker 121 reads a host's scan configuration record and, in step 620, the decision maker 121 examines the host's scan configuration record. In step 625, if the host is due for an audit scan, the host is added to the set of hosts to be scanned with the scan policy indicated in the scan configuration record. The decision maker 121 checks for a user-initiated shutdown in step 630, and proceeds to shut down if so indicated. Otherwise, in step 635 the decision maker 121 checks for more host scan configuration records. If there are more records to read, the process 315 returns to step 615, and is repeated with the next record. If there are no records remaining to be processed, the decision maker 121 resets itself in step 640. This step involves setting parameters governing the next periodic run of the decision maker 121.

Figure 7:
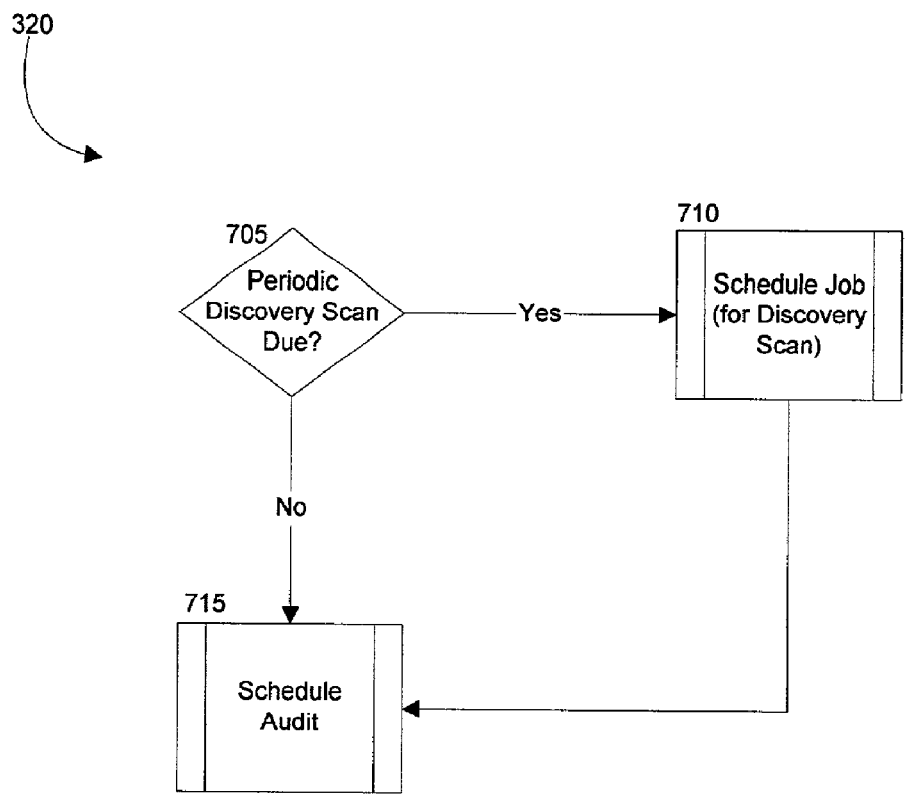
FIG. 7 is a logic flow diagram illustrating an exemplary process for scheduling scans with a security audit system.

The type of scan that is run on each host for an element in the network 110 can be selected manually by the user or done automatically by the active scan engine 120. The advantage of automating the scan configuration is that there are often numerous elements to scan in a network and hundreds of possible scanning checks that can be performed on each element. By automating the process, configuring and scheduling scans of each element of the network can be performed periodically, or whenever a new element is found during a discovery scan FIG. 7 illustrates an exemplary decision step for determining whether to schedule a discovery scan or an audit scan. A discovery scan is conducted periodically, or when a network is being audited for the first time. If a discovery scan is being conducted in step 710, the active scan engine 120 can follow the exemplary method for scheduling a job illustrated in FIG. 8. If an audit scan is going to be conducted in step 715, the active scan engine 120 locates other hosts with the same scan policy as shown in FIG. 9.

A scan policy comprises a list of vulnerabilities to be checked during a scan. Scanning all the hosts with the same policy at one time allows the active scan engine 120 to coordinate scans efficiently. Once the other hosts with the same policy are located in step 905, a job is scheduled for the audit scan in step 910 in the same way that a job is scheduled for a discovery scan. If more host ranges have been configured for scans, step 915 will return to step 905 and the process will repeat for the next host range. Otherwise, the process is complete.

Figure 8:
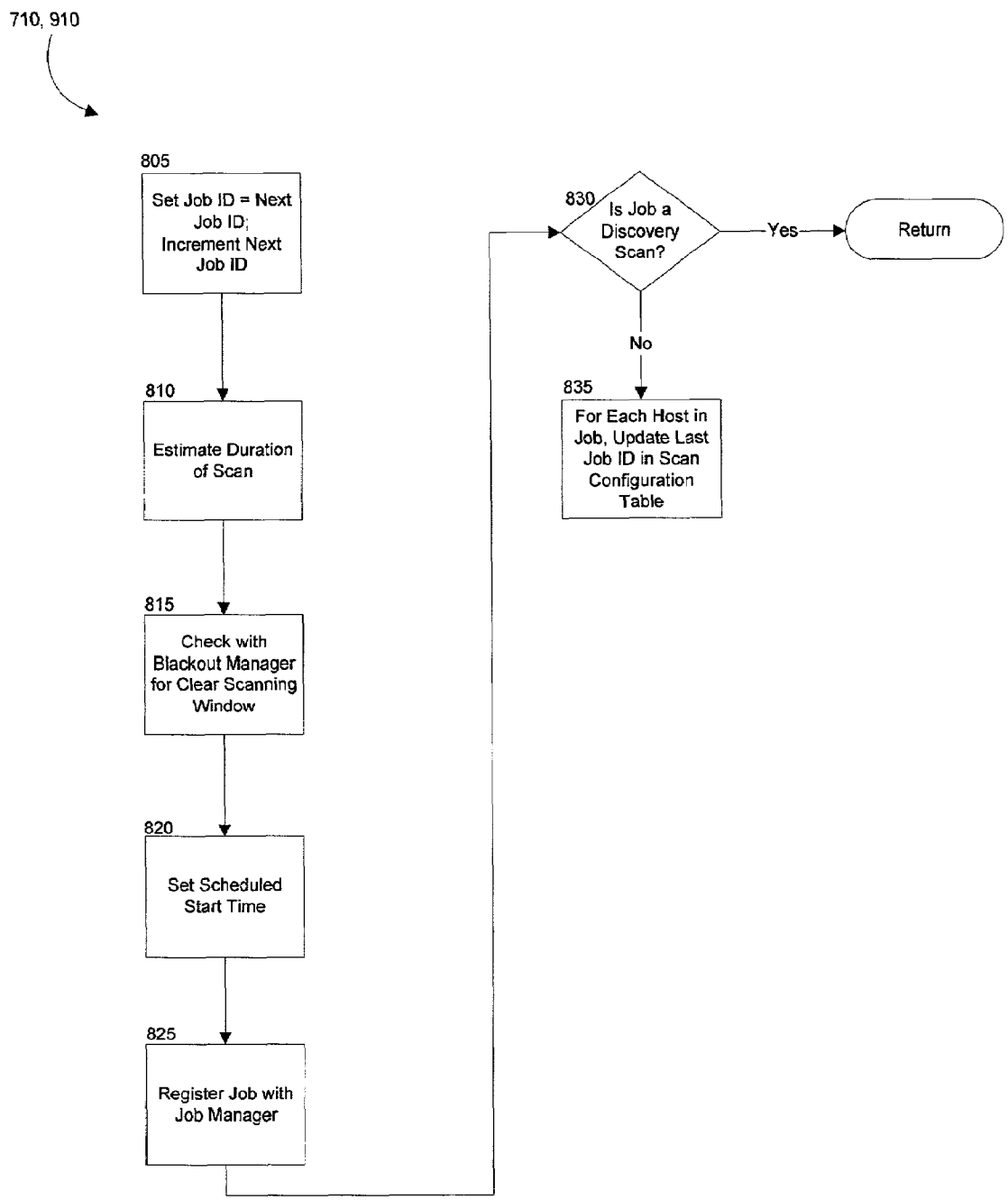
FIG. 8 is a logic flow diagram illustrating an exemplary process for scheduling specific scan jobs with a security audit system.
Figure 9:
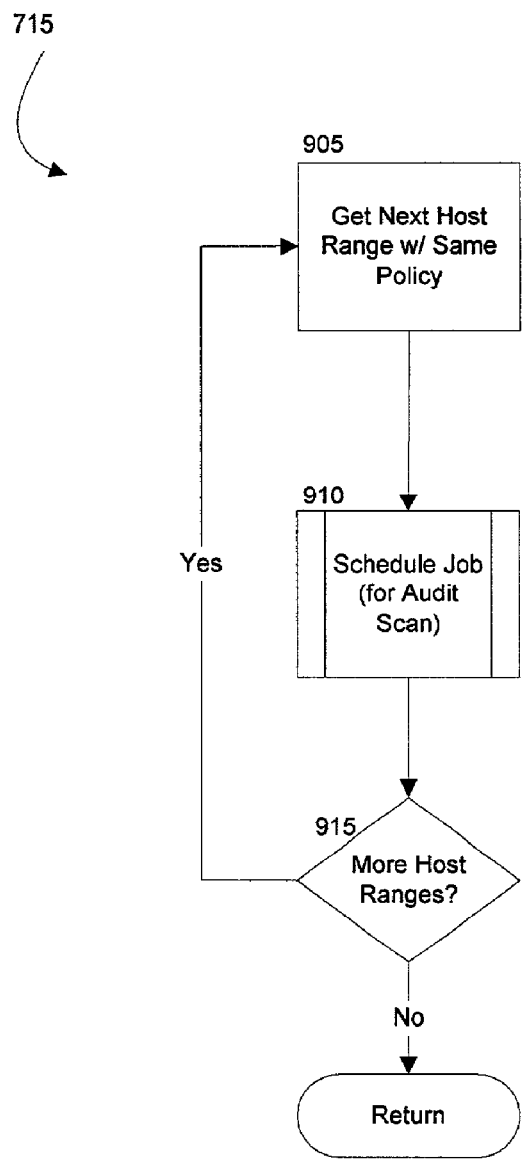
FIG. 9 is a logic flow diagram illustrating an exemplary process for scheduling an audit scan with a security audit system.

An exemplary method for scheduling a job is illustrated in FIG. 8. In step 805, a unique job identifier is assigned to the scan job. In step 810, the active scan engine 120 estimates the duration of the scan and checks with the blackout manager, in step 815, for a clear time period of at sufficient duration for scanning. Once a time period is selected for the scan job, in step 820 a start time is scheduled. In step 825, the job is registered with the job manager 122 in the active scan engine 120 so that it can be tracked. In step 830, if the scheduled job is for a discovery scan, the process is complete. Otherwise, in step 835 the last scan job identifier is updated for each host included in the newly scheduled job.

Figure 10:
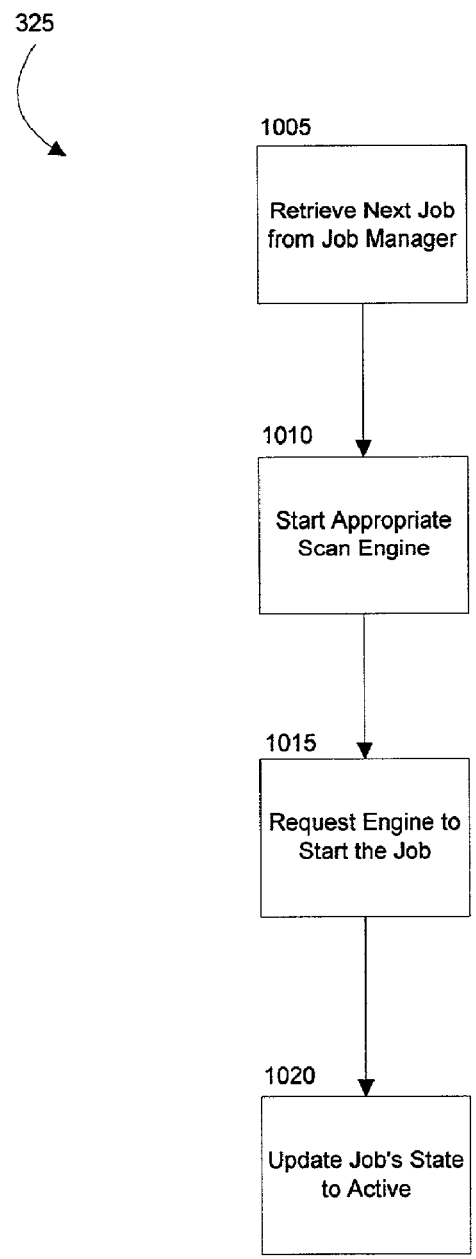
FIG. 10 is a logic flow diagram illustrating an exemplary process for running security scans with a security audit system.

Once a job is scheduled, the scan is ready to run against the appropriate elements in the network 110. An exemplary method for running a scan, as referred to in step 325 of FIG. 3, is illustrated in greater detail in FIG. 10. In step 1005, the active scan engine 120 retrieves the next available job from the job manager. Depending on the type of scan that is to be run, in step 1010, the active scan engine 120 starts the appropriate scan engine. In steps 1015 and 1020, the active scan engine 120 sends a request to the appropriate scan engine to start the job and updates the job status to active. Running the scan collects data about one or more of the various elements in the network and returns that data to the active scan engine 120 for analysis.

Figure 11:
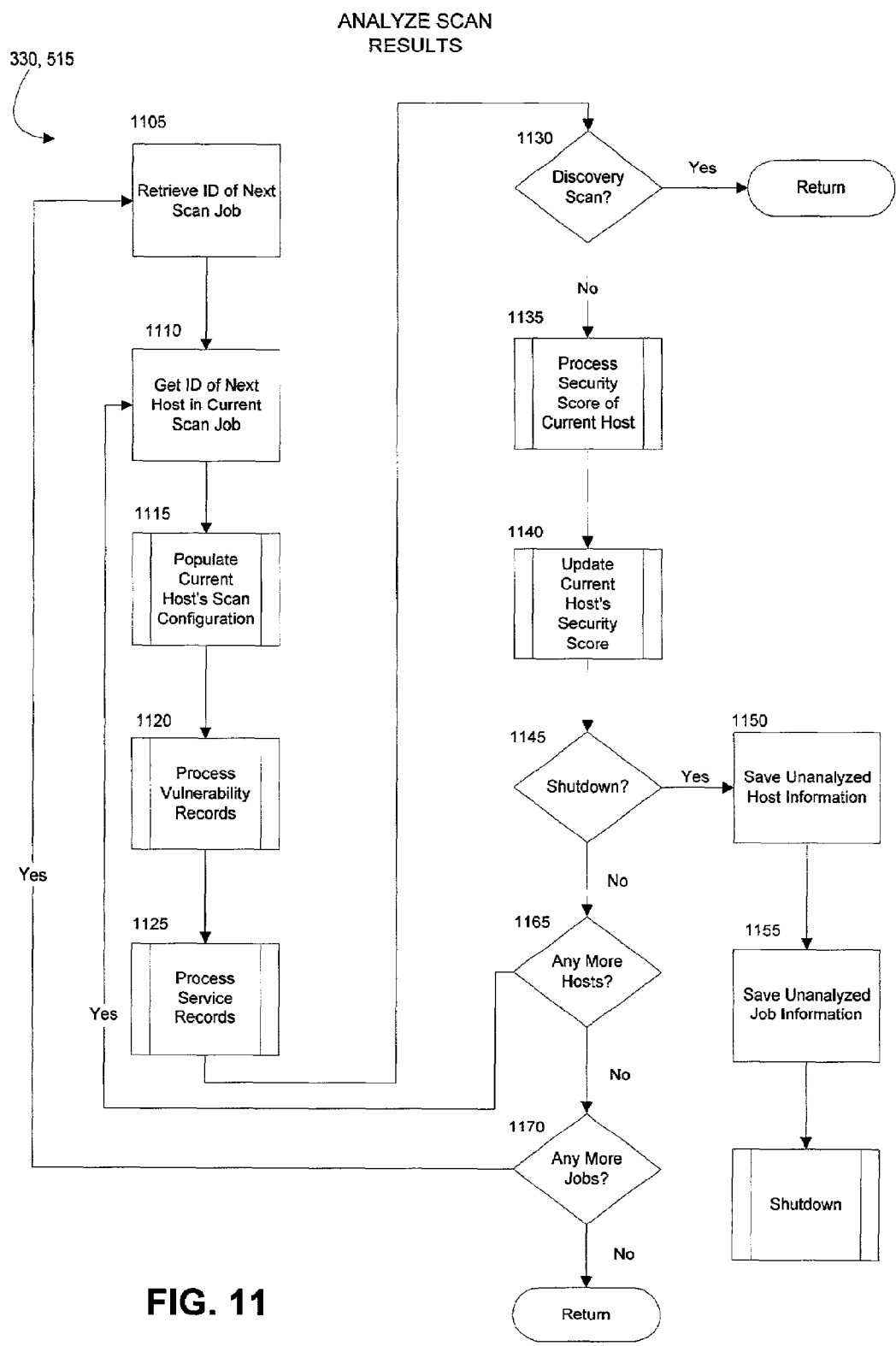
FIG. 11 is a logic flow diagram illustrating an exemplary process for analyzing scan results with a security audit system.

Referring to FIG. 11, an exemplary method for analyzing scan results, as referenced in step 330 of FIG. 3 and step 515 of FIG. 5, is illustrated. In step 1105, the analyzer component 123 selects the next scan job to analyze. In step 1110, the analyzer 123 selects the next host to process in the current scan job's data. If this is the first time that the host is examined, then the data are from a discovery scan. The current host's scan configuration record is written or updated in step 1115. Based on the host function and asset value, further scan policies can also be automatically selected by the scan engine for future audit scans against the host. In steps 1120 and 1125, the analyzer 123 processes the vulnerability and service records for the current host.

If the scan was a discovery scan, the analysis process ends at step 1130. However, if the scan was an audit scan, the analysis process continues in step 1135, where a new security score is computed for the host. An advantageous means for calculating a security score is described in U.S. non-provisional patent application entitled "Method and System for Calculating Risk Associated with a Security Audit," filed concurrently herewith, having attorney docket number 05456.105036. An exemplary method for processing a security score is discussed in greater detail with reference to FIG. 19. In step 1140, the host's previous security score is updated. If the user initiated a shutdown of the security audit system 115 at this time, any unanalyzed host information or job information is saved in steps 1150 and 1155. If there are more hosts to be analyzed or more scan jobs to be performed in steps 1165 and 1170, the process will return to the beginning and repeat.

Figure 12:
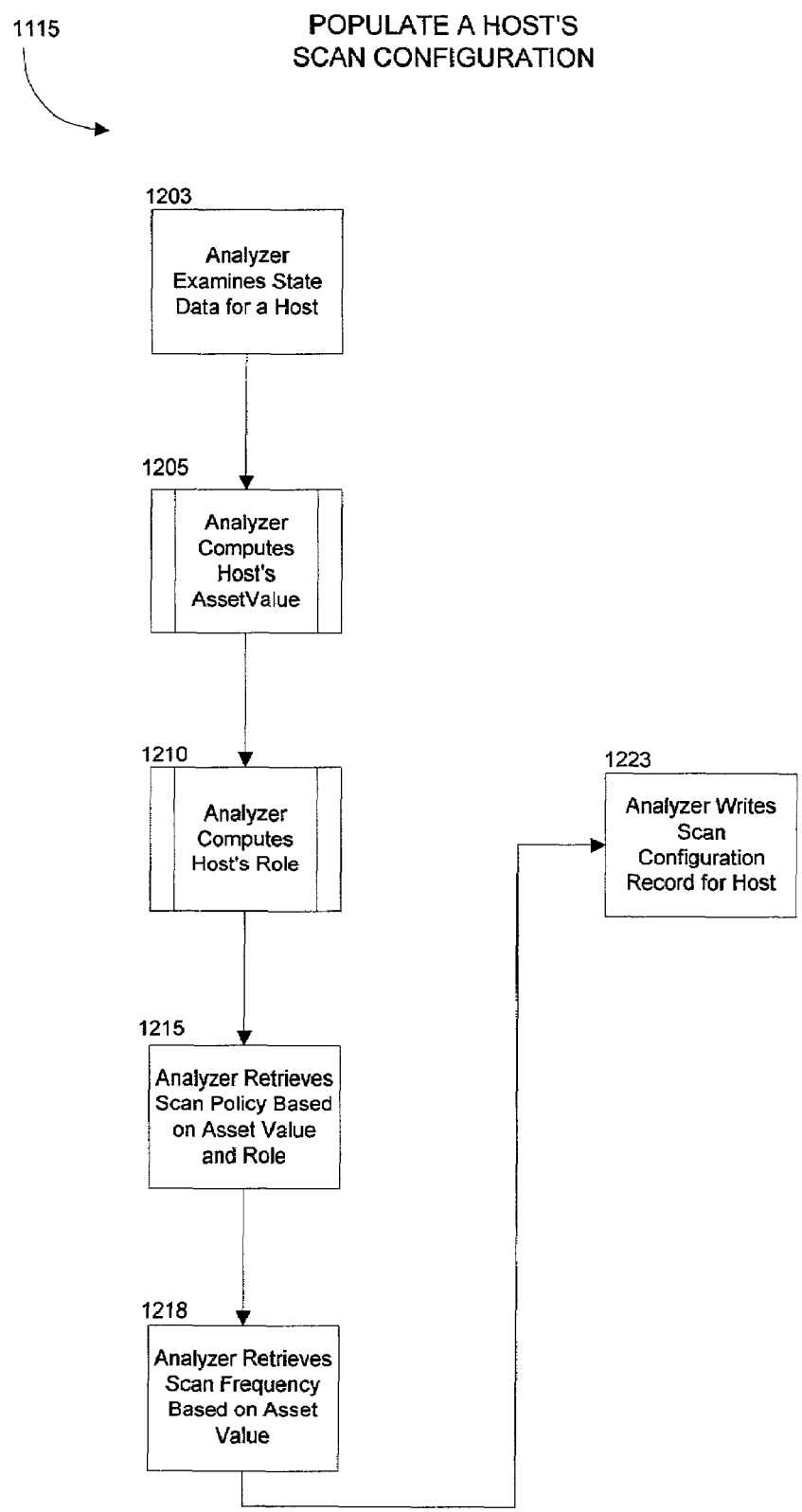
FIG. 12 is a logic flow diagram illustrating an exemplary process for populating a host's Scan Configuration record with a security audit system.

In FIG. 12, an exemplary method for populating a host's scan configuration, as referenced in step 1115 of FIG. 11, is illustrated. In step 1203, the analyzer 123 examines the state data for the current host. These data indicate what operating system and services a host is running, and form the basis for computing the host's asset value in step 1205 and its role in step 1210. In step 1215, the analyzer 123 retrieves the scan policy to be applied to the host based on its asset value and role. FIG. 6B is an exemplary table that maps a host role and asset value to a scan policy. In step 1218, the scan frequency of the host is computed as a function of its asset value. FIG. 6C illustrates an exemplary table for mapping a host's asset value to a scan frequency. Both of the mapping tables illustrated in FIGS. 6B and 6C may be adjusted and customized by the user. The analyzer 123 writes or updates the host's scan configuration record in step 1223.

Figure 13:
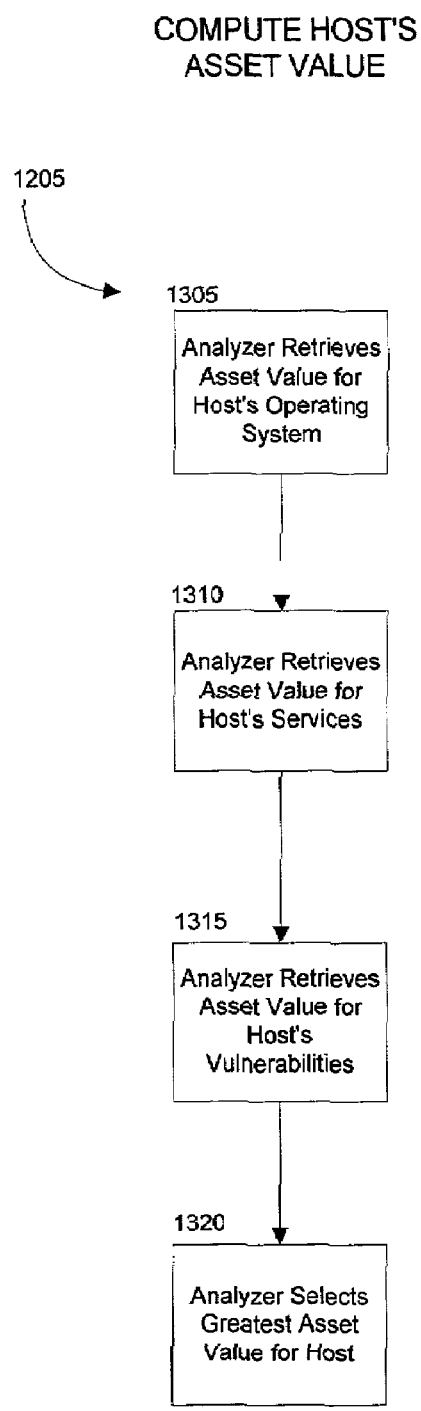
FIG. 13 is a logic flow diagram illustrating an exemplary process for computing a host's asset value with a security audit system.

FIG. 13 illustrates an exemplary method for computing a host's asset value, as referenced in step 1205 of FIG. 12. In step 1305, the analyzer 123 retrieves from the ASE database 125 the asset value associated with the host's operating system. Asset values assigned on the basis of operating system reflect the greater importance of servers and routers than regular desktop systems. In step 1310, the analyzer 123 retrieves the asset value associated with the host's running services. Asset values are associated with a number of services in the ASE database 125, and reflect the relative importance of the various services. In step 1310, the analyzer 123 selects the maximum asset value associated with any of the services that are active on the host. In step 1315, the analyzer 123 retrieves the asset value associated with the host's vulnerabilities. As with services, the presence of some vulnerabilities can indicate a greater importance for a host; the asset values associated with vulnerabilities in the ASE database 125 reflect this. In the present example, the maximum asset value associated with any of the host's vulnerabilities is chosen. In step 1320, the analyzer 123 selects the maximum of the previously retrieved asset values as the host's asset value.

Figure 14:
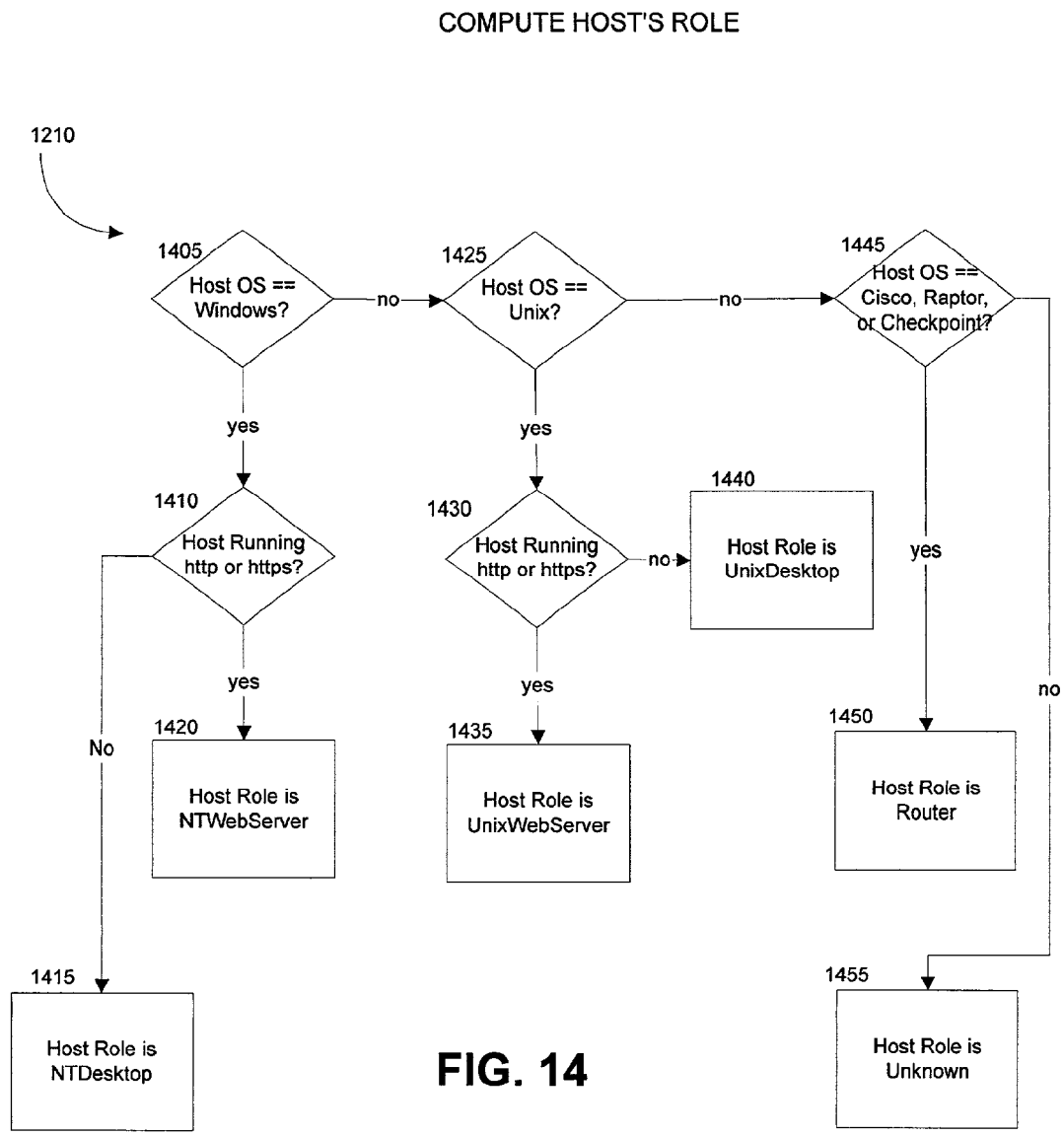
FIG. 14 is a logic flow diagram illustrating an exemplary process for computing a host's role with a security audit system.

FIG. 14 illustrates an exemplary method for computing a host's role, as referenced in step 1210 of FIG. 12. Steps 1405, 1425, and 1445 distinguish between various exemplary host operating systems. The next layer of decisions (steps 1410 and 1430) distinguish between web servers and non-web servers. As shown in the figure, the exemplary host roles identified are NTDesktop (step 1415), NTWebServer (step 1420), UnixWebServer (step 1435), UnixDesktop (step 1440), Router (step 1450), and Unknown (step 1455). While FIG. 14 shows an exemplary implementation of determining a host's role on a network, those skilled in the art will recognize that other host parameters may be taken into account, yielding a greater variety of roles.

Figure 15:
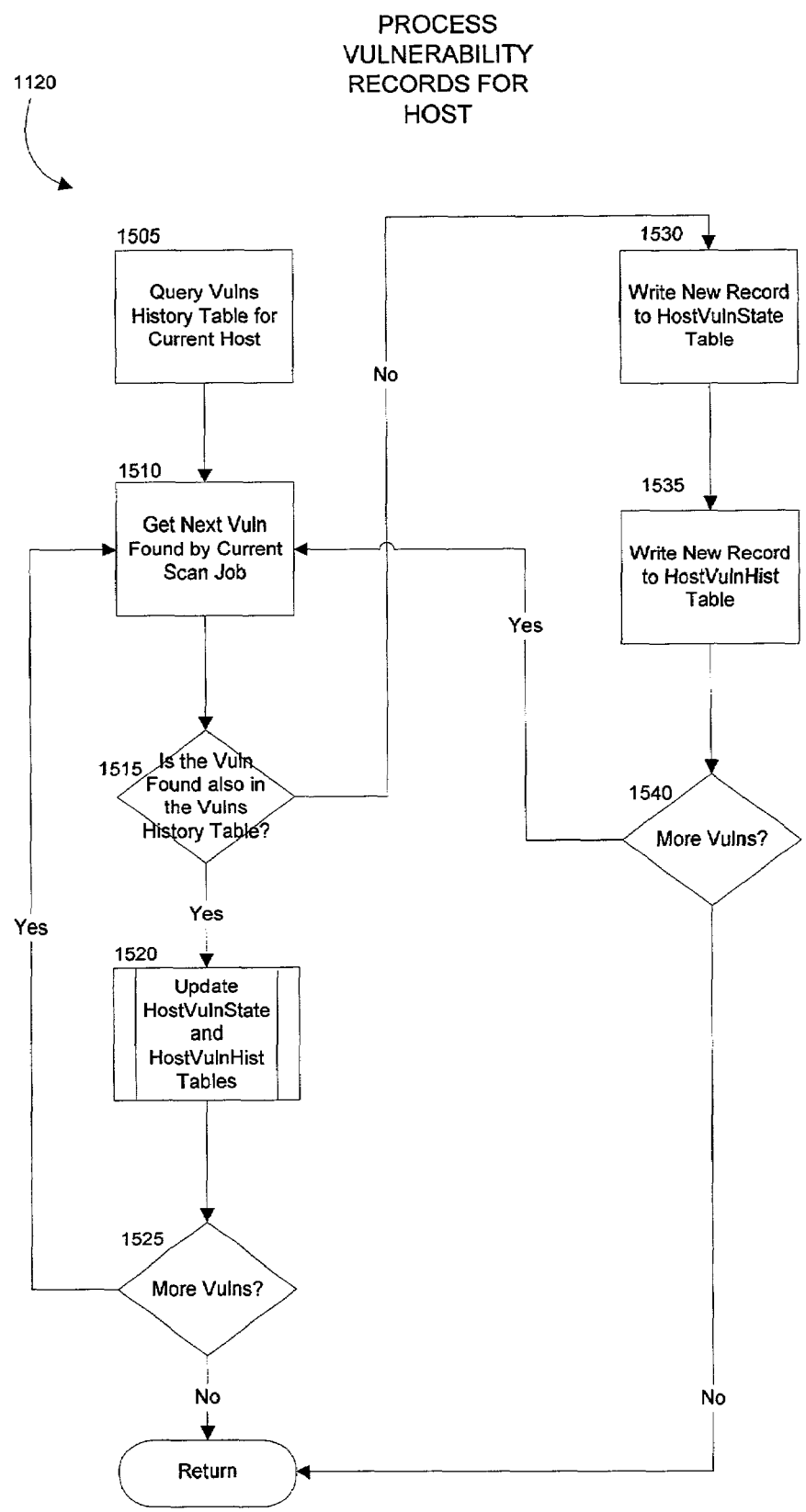
FIG. 15 is a logic flow diagram illustrating an exemplary process for processing vulnerabilities found on a host with a security audit system.
Figure 16:
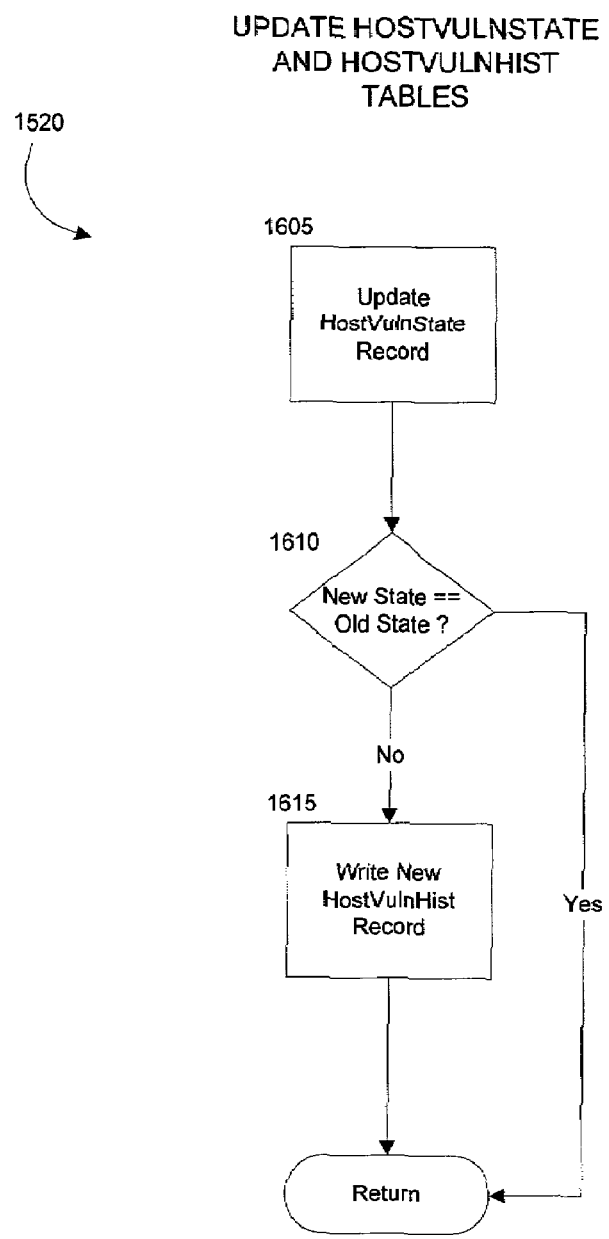
FIG. 16 is a logic flow diagram illustrating an exemplary process for updating vulnerability state and history tables with a security audit system.

Referring to FIG. 15, an exemplary method for processing vulnerability records is illustrated. In step 1505, the analyzer 123 queries the vulnerability history table for the current host. In step 1510, a vulnerability identified during the audit scan is located and the vulnerability history table is examined for the same listing in step 1515. If the vulnerability is listed in the history table, the state table and history table are updated for the particular host in step 1520. As shown in greater detail in the exemplary logic flow diagram in FIG. 16, step 1520 involves the analyzer 123 updating the record in the state table and the record in the history table. If the vulnerability is not found in the history table in step 1515, the analyzer 123 writes a new record to the state table and history table in steps 1530 and 1535. If there are more vulnerabilities to be examined, the process returns to step 1510. Once the vulnerability records for a host are processed, the logic flow diagram returns to step 1125 for processing service records.

Figure 17:
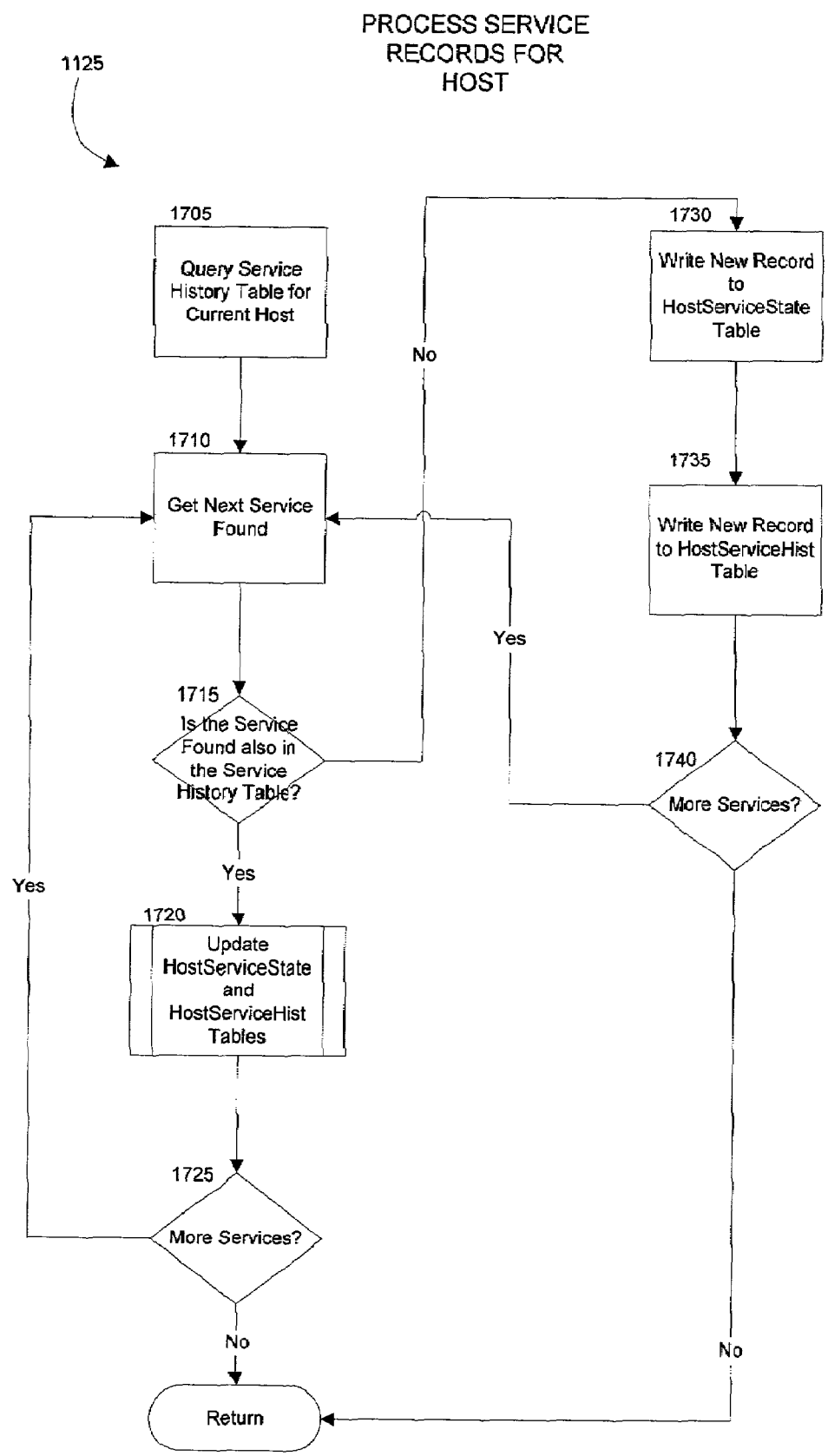
FIG. 17 is a logic flow diagram illustrating an exemplary process for processing running services found on a host with a security audit system.
Figure 18:
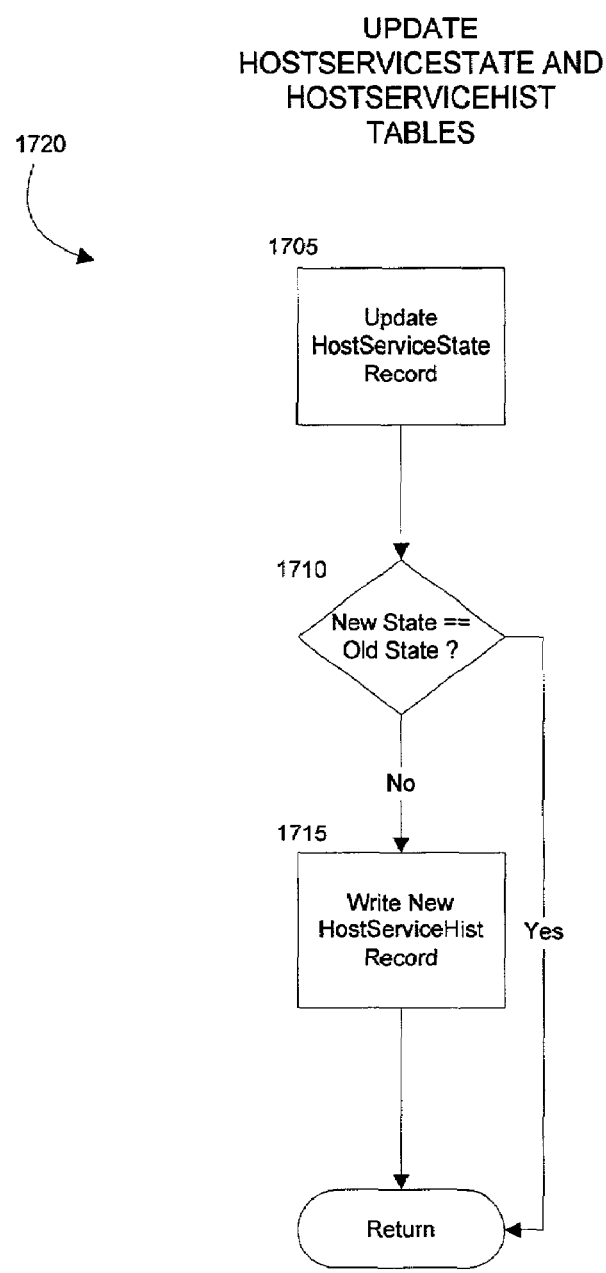
FIG. 18 is a logic flow diagram illustrating an exemplary process for updating service state and history tables with a security audit system.

An exemplary method for processing service records, as referred to in step 1125 of FIG. 11, is illustrated in FIG. 17. In step 1705, the analyzer 123 queries the service history table for the current host that is being examined. In step 1710, a service identified during the audit scan is located and the service history table is examined for the same listing in step 1715. If the service is listed in the history table, the analyzer 123 updates the state table and history table for the particular host in step 1720. As shown in greater detail in the exemplary logic flow diagram in FIG. 18, step 1720 involves updating the record in the state table and the record in the history table. If the service is not found in the history table in step 1715, the analyzer 123 writes a new record to the state table and history table in steps 1730 and 1735. If there are more services to be examined, the process returns to step 1710. Once the service records for a host are processed, the logic flow diagram returns to step 1130.

Figure 19:
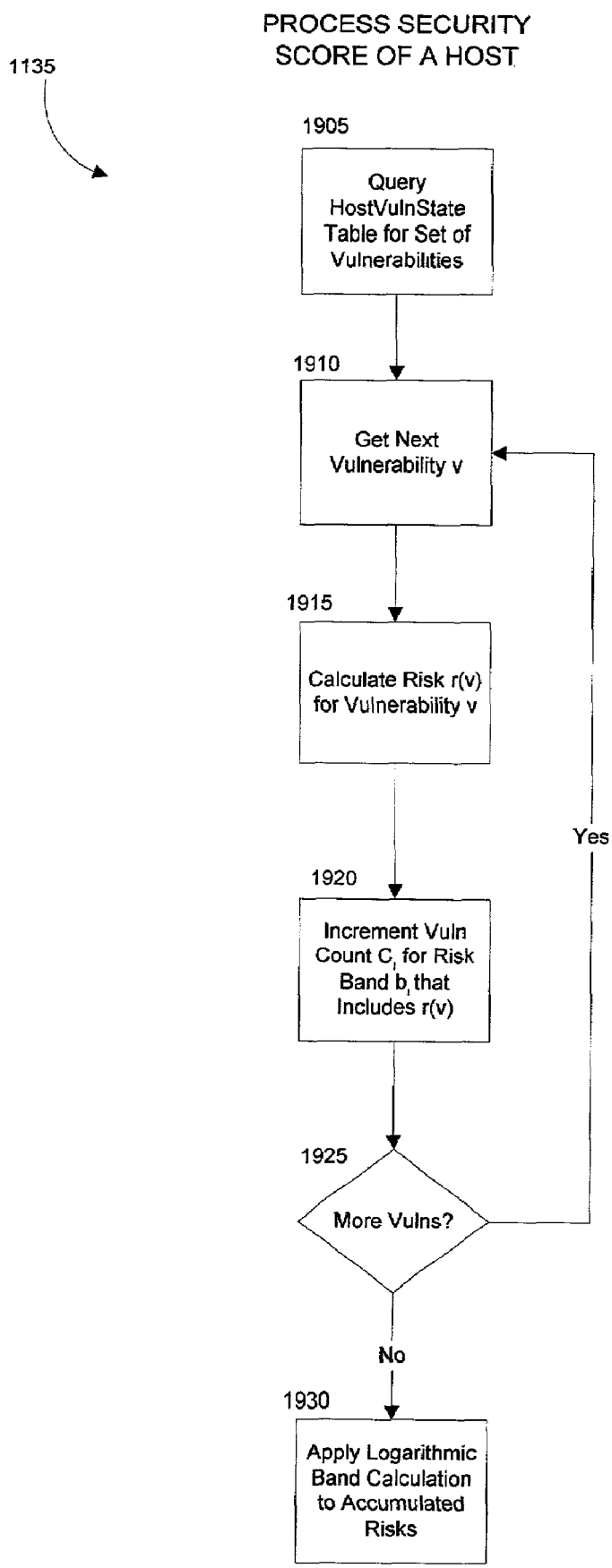
FIG. 19 is a logic flow diagram illustrating an exemplary process for processing a host's security score with a security audit system

An exemplary method for processing the security score of a host is illustrated in FIG. 19. In step 1905, the active scan engine 120 queries the vulnerability state table for the set of vulnerabilities for the current host. The vulnerabilities were previously detected by the various scans performed on the particular host. The active scan engine 120 selects the next vulnerability in the state table in step 1910 and calculates a risk for the vulnerability in step 1915. An exemplary method for calculating a risk in association with a security audit of a computer network is taught in the related application referenced herein. In step 1920, the vulnerability count for the risk band that includes the calculated risk is incremented. If there are additional vulnerabilities in the state table, the process is repeated and the vulnerability count for the appropriate band is incremented. When there are no remaining active vulnerabilities for this host in the state table, a logarithmic band calculation is applied to the accumulated risks in step 1930. An exemplary method for performing a logarithmic band calculation on accumulated risks is taught in the related application referenced herein.

Figure 20:
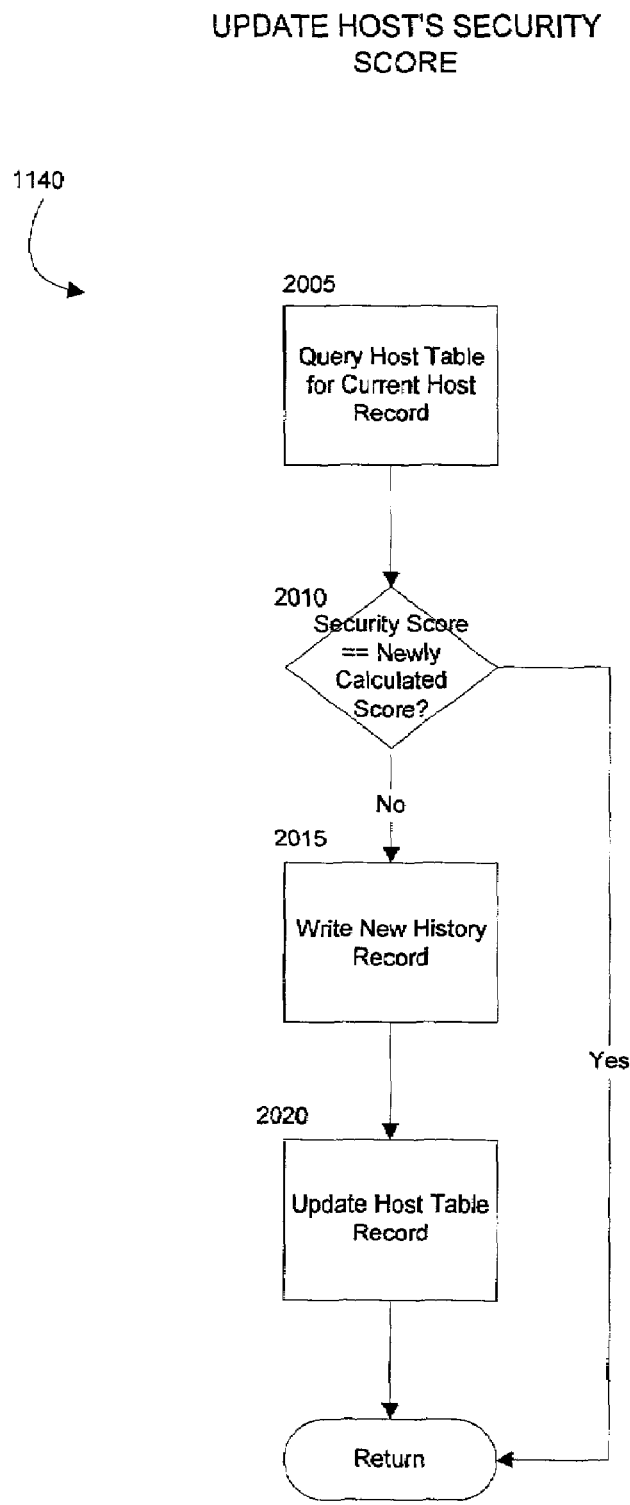
FIG. 20 is a logic flow diagram illustrating an exemplary process for updating a host's security score with a security audit system

The security audit system 115 keeps a record of security scores over time. In step 2005 of FIG. 20, the most current host security score is retrieved from the host table. If the most current security score is different from the newly calculated score in step 2010, the active scan engine 120 writes a new record to the host history table in step 2015, and updates the host's current security score in the host table in step 2020. If the security score is not different in step 2010, the process returns to step 1145 in FIG. 11. The forgoing steps illustrate an exemplary method for processing the security score of the host. In alternative embodiments of the invention other methods can be used to compute security scores for various elements in a distributed computing network.

Figure 21:
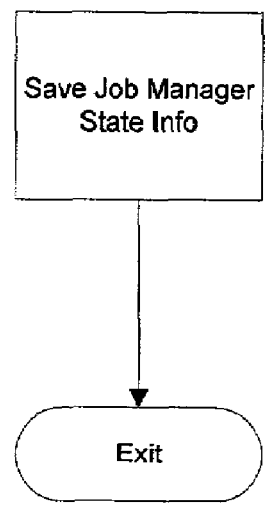
FIG. 21 is a logic flow diagram illustrating an exemplary process for shutting down a security audit system.

FIG. 21 illustrates an exemplary method for shutting down the active scan engine 120, as referenced in various figures. The shutdown procedure consists of saving any state information necessary to resume any operations in progress at the time of shutdown. This information consists of information about jobs scheduled but not completed, jobs completed but not analyzed, and jobs incompletely analyzed.

In conclusion, the present invention enables and supports security auditing of a distributed computing network. The security audit system can conduct a discovery scan of the network to identify network elements and determine their function, vulnerabilities, and relative importance. Using this information, more comprehensive audit scans are scheduled to regularly assess and monitor the security of the network. The security audit system can automatically select particular audit scans based on the types of hosts identified in the network. The audit scans can be automatically scheduled so as not to interfere with the regular functions of the network. Information collected during the audit scans can also be used to compute a security score for a network element.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof. Although the present invention has been described as operating on a local area network, it should be understood that the invention can be applied to other types of distributed computing environments. Furthermore, it should be readily apparent that the components of the security audit system can be located in various local and remote locations of a distributed computing environment.

What is claimed is:

1. A computer-implemented method for configuring and scheduling a security audit of a computer network comprising the steps of:

conducting a discovery scan to identify an element of the computer network and determine the element's functions and assigning an asset value for the element wherein the asset value indicates the relative importance of the element in the network;

configuring an audit scan to perform on the element, wherein the audit scan is a broader scan than the discovery scan;

scheduling a time to perform the audit scan on the element;

running the audit scan of the element at the scheduled time;

calculating a security score for the element based on the audit scan by summing one or more vulnerabilities associated with the element; and scheduling another time to repeat the audit scan on the element, the scheduling based on the results of the audit scan and the security score.

2. The method of claim 1, further comprising the step of configuring a subsequent audit scan of the element that is different from the audit scan.

3. The method of claim 1, further comprising the step of receiving a blackout time during which no audit scan can be scheduled.

4. The method of claim 1, wherein the step of conducting a discovery scan further comprises identifying the function of the element.

5. The method of claim 1, wherein the step of conducting a discovery scan further comprises identifying the one or more vulnerabilities associated with the element.

6. The method of claim 1, wherein the asset value is modified based on the audit scan.

7. The method of claim 1, further comprising the step of receiving a manually selected asset value for the element.

8. The method of claim 1, wherein the step of configuring an audit scan comprises selecting a type of audit scan based on the discovery scan.

9. The method of claim 1, wherein the step of configuring an audit scan comprises:
retrieving an asset value based on the discovery scan;
retrieving a scan frequency associated with the asset value, wherein the scan frequency indicates how often the scan is performed;
assigning a role based on the discovery scan, wherein the role indicates the function of the element; and
assigning a policy based on the discovery scan, wherein the policy indicates the type of audit scan.

10. The method of claim 1, wherein the step of configuring an audit scan comprises manually selecting the type of audit scan.

11. A computer prepare product for implementing security for a computing device, said computer program product comprising:
a computer readable medium having encoded therein;
first program instructions to conduct a discovery scan to identify an element of the computer network and determine the element's functions and assign an asset value for the element, wherein the asset value indicates the relative importance of the element in the network;
second program instructions to configure an audit scan to perform on the element, wherein the audit scan is a broader scan than the discovery scan;
third program instructions to schedule a time to perform the audit scan on the element;
fourth program instructions to run the audit scan of the element at the scheduled time;
fifth program instructions to calculate a security score for the element based on the audit scan by summing one or more vulnerabilities associated with the element; and
sixth program instructions to schedule another time to repeat the audit scan on the element, the scheduling based on the results of the audit scan and the security score.

12. The computer program product of claim 11, further comprising seventh program instructions to configure a subsequent audit scan of the element that is different from the audit scan.

13. The computer program product of claim 11, further comprising eighth program instructions to receive a blackout time during which no audit scan can be scheduled.

14. The computer program product of claim 11, wherein the first program instructions further comprise instructions to identify the function of the element.

15. The computer program product of claim 11, wherein the first program instructions further comprise instructions to identify the one or more vulnerabilities associated with the element.

16. The computer program product of claim 11, further comprising ninth program instructions to modify the asset value based on the audit scan.

17. The computer program product of claim 11, further comprising tenth program instructions to receive a manually selected asset value for the element.

18. The computer program product of claim 11, wherein the second program instructions further comprise instructions to select a type of audit scan based on the discovery scan.

19. The computer program product of claim 11, wherein the second program instructions further comprise instructions to:
retrieve an asset value based on the discovery scan;
retrieve a scan frequency associated with the asset value, wherein the scan frequency indicates how often the scan is performed;
assign a role based on the discovery scan, wherein the role indicates the function of the element; and
assign a policy based on the discovery scan, wherein the policy indicates the type of audit scan.

* * * * *